US008228593B2

(12) United States Patent
Shirai et al.

(10) Patent No.: US 8,228,593 B2
(45) Date of Patent: Jul. 24, 2012

(54) SYSTEM CONFIGURATIONS AND METHOD FOR CONTROLLING IMAGE PROJECTION APPARATUSES

(75) Inventors: Akira Shirai, Hino (JP); Yoshihiro Maeda, Hachioji (JP); Hirokazu Nishino, Akishima (JP); Fusao Ishii, Menlo Park, CA (US)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 920 days.

(21) Appl. No.: 12/286,816

(22) Filed: Oct. 1, 2008

(65) Prior Publication Data
US 2009/0103158 A1  Apr. 23, 2009

Related U.S. Application Data

(60) Provisional application No. 60/997,478, filed on Oct. 2, 2007.

(51) Int. Cl.
*G02B 26/00* (2006.01)
(52) U.S. Cl. ........................ 359/290
(58) Field of Classification Search .......... 359/290, 359/291, 292, 237, 242, 443, 453, 456, 460; 353/31; 345/32, 38
See application file for complete search history.

(56) References Cited

U.S. PATENT DOCUMENTS

| 5,537,258 A | 7/1996 | Yamazaki et al. |
| 5,617,243 A | 4/1997 | Yamazaki et al. |
| 5,706,061 A | 1/1998 | Marshall et al. |
| 5,872,611 A | 2/1999 | Hirata et al. |
| 6,657,759 B2 * | 12/2003 | Muller ............... 359/225.1 |
| 6,778,304 B1 * | 8/2004 | Muller ............... 359/225.1 |
| 7,207,677 B2 | 4/2007 | Takeda et al. |
| 7,215,458 B2 | 5/2007 | Richards et al. |
| 7,492,378 B2 * | 2/2009 | Nishino et al. ........ 345/694 |
| 2005/0254116 A1 | 11/2005 | Ishii |

* cited by examiner

*Primary Examiner* — Ricky Mack
*Assistant Examiner* — Tuyen Tra
(74) *Attorney, Agent, or Firm* — Bo-In Lin

(57) ABSTRACT

A projection apparatus implemented with a mirror device that includes a first electrode and a second electrode with an elastic hinge disposed between the first electrode part and second electrode. The elastic hinge supports a mirror and the mirror is controlled to deflect when drawn by a Coulomb force generated between the mirror and electrodes by applying a voltage to the electrodes. The projection apparatus further includes a light source for projecting a light to the mirror for modulating the light by deflecting the mirror to different deflection states. The light source suppresses the emission of the illumination light during a period when the mirror performs a series of operations to shift from a non-deflection state, placing the mirror in a stationary and non-deflection state, to a predetermined deflection state.

12 Claims, 26 Drawing Sheets

Fig. 1A (Prior Art)
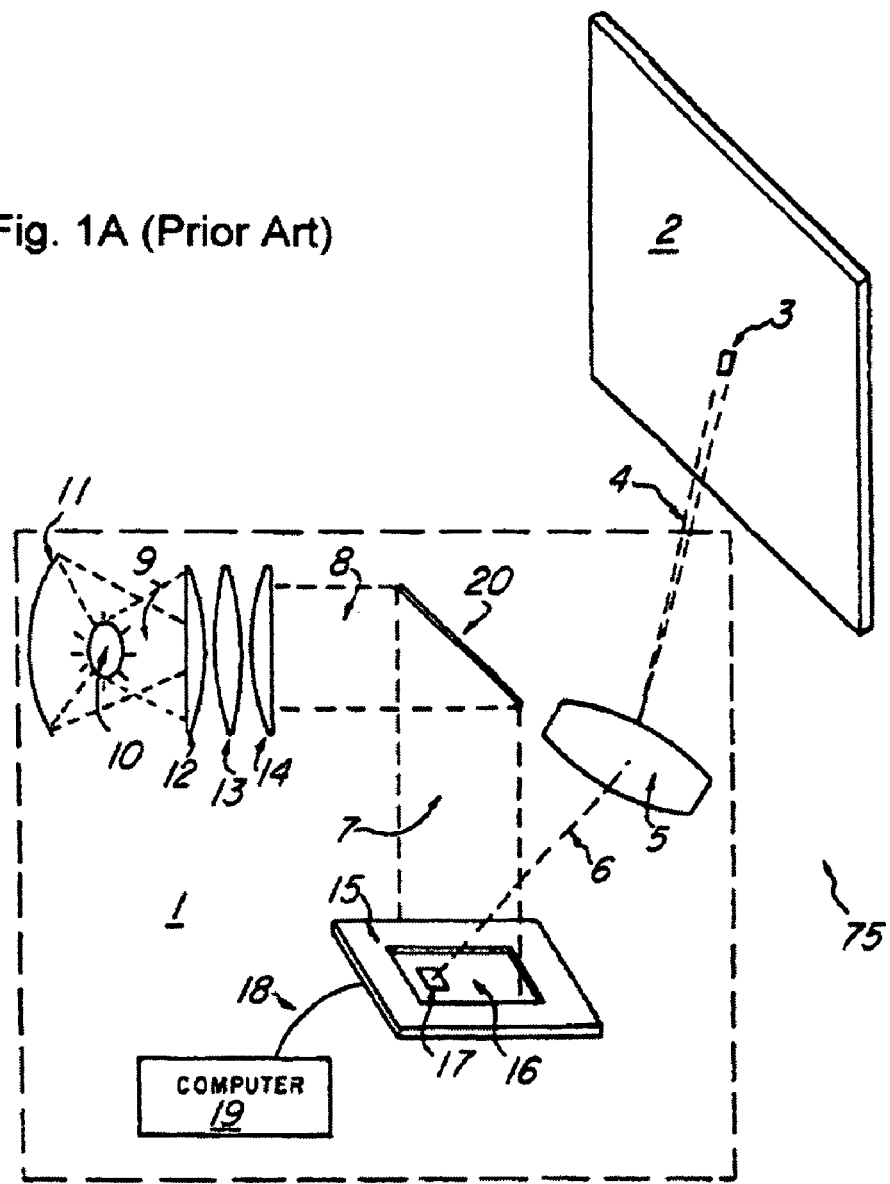
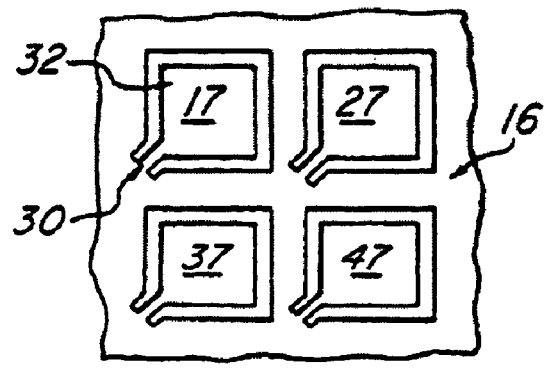
Fig. 1B (Prior Art)

SYSTEM CONFIGURATIONS AND METHOD FOR CONTROLLING IMAGE PROJECTION APPARATUSES

CROSS REFERENCE TO RELATED APPLICATIONS

This application is a Non-provisional application claiming a Priority date of Oct. 2, 2007 based on a previously filed Provisional Application 60/997,478 and a Non-provisional patent application Ser. No. 11/121,543 filed on May 3, 2005 issued into U.S. Pat. No. 7,268,932. The application Ser. No. 11/121,543 is a Continuation In Part (CIP) Application of three previously filed applications. These three applications are Ser. No. 10/698,620 filed on Nov. 1, 2003, Ser. No. 10/699,140 filed on Nov. 1, 2003 now issued into U.S. Pat. No. 6,862,127, and 10/699,143 filed on Nov. 1, 2003 now issued into U.S. Pat. No. 6,903,860 by the Applicant of this patent applications. The disclosures made in these patent applications are hereby incorporated by reference in this patent application.

BACKGROUND OF THE INVENTION

1. Field of the Invention

The present invention relates generally to system configuration and method for controlling an image projection apparatus. More particularly, this invention relates to an image projection apparatus implemented with coordinated control for turning on and off the light source corresponding to the operation states of the mirror device performing the function as a spatial light modulator.

2. Description of the Related Art

Even though there have been significant advances made in recent years in the technologies of implementing electromechanical mirror devices as spatial light modulators (SLM), there are still limitations and difficulties with displaying high quality images. Specifically, when the display images are digitally controlled, the quality of the images is adversely affected because they are not displayed with a sufficient number of gray scales.

Electromechanical mirror devices have drawn considerable interest because of their application as spatial light modulators (SLM). A spatial light modulator requires an array of a relatively large number of micromirror devices. In general, the number of devices required ranges from 60,000 to several millions for each SLM. Referring to FIG. 1A for a digital video system 1 includes a display screen 2 disclosed in a relevant U.S. Pat. No. 5,214,420. A light source 10 is used to generate light beams to project illumination for the display images on screen 2. The light 9 projected from the light source is further concentrated and directed toward lens 12 by way of mirror 11. Lenses 12, 13 and 14 form a beam columnator operative to columnate the light 9 into a column of light 8. A spatial light modulator (SLM) 15 selectively redirects a portion of the light from path 7 toward lens 5 to display on screen 2 through data transmitted over data cable bus 18. FIG. 1B shows a SLM 15 that has a surface 16 that includes an array of switchable reflective elements 17, 27, 37, and 47, each of these reflective elements is attached to a hinge 30. When the element 17 is in an ON position, a portion of the light from path 7 is reflected and redirected along path 6 to lens 5 where it is enlarged or spread along path 4 to impinge on the display screen 2, forming an illuminated pixel 3. When the element 17 is in an OFF position, the light is reflected away from the display screen 2, and, hence, pixel 3 is dark.

Each mirror element that constitutes a mirror device to function as a spatial light modulator (SLM) is comprised of a mirror and electrodes. A voltage applied to the electrode(s) generates a coulomb force between the mirror and the electrode(s), thereby making it possible to control and incline the mirror for deflection.

When a mirror is deflected by a voltage applied to the electrode(s), the direction of the reflected incident light also changes. The direction of the reflected light is changed in accordance with the deflection angle of the mirror. When almost all of an incident light is reflected onto a projection path designated for a display image, it is referred to as an "ON light". When a light is not reflected to the designated projection path for the display image, it is referred to as an "OFF light".

"Intermediate light" refers to the light reflected to a projection path with a smaller quantity of light than the ON light, and a ratio exists between the incident light reflected to a projection path (i.e., the ON light) and that reflected from a projection path (i.e., the OFF light). According to the convention of present specification, a clockwise (CW) angle of rotation is positive (+) and a counterclockwise (CCW) angle of rotation is negative (−). A deflection angle is defined as zero degree (0°) when the mirror is in the initial state.

The on-and-off states of the micromirror control scheme as that implemented in the U.S. Pat. No. 5,214,420, and in most conventional display systems, limit the quality of the display. Specifically, applying the conventional configuration of a control circuit limits the gray scale gradations produced in a conventional system (PWM between ON and OFF states), which is limited by the LSB (least significant bit, or the least pulse width). Due to the ON-OFF states implemented in the conventional systems, there is no way of providing a shorter pulse width than the duration represented by the LSB. The least quantity of light, which determines the gray scale, is the light reflected during the least pulse width. The limited levels of gray scale lead to degradation of the display image.

Specifically, FIG. 1C exemplifies, as related disclosures, a circuit diagram for controlling a micromirror according to U.S. Pat. No. 5,285,407. The control circuit includes memory cell 32. Various transistors are referred to as "M*" where "*" designates a transistor number and each transistor is an insulated gate field effect transistor. Transistors M5 and M7 are p-channel transistors; transistors M6, M8, and M9 are n-channel transistors. The capacitances, C1 and C2, represent the capacitive loads in the memory cell 32. The memory cell 32 includes an access switch transistor 9 and a latch 32a, based on a Static Random Access Switch Memory (SRAM) design. All access transistors M9 on Row line receive a DATA signal from Bit-line 31a. The particular memory cell 32 is accessed for writing a bit to the cell by turning on the appropriate row select transistor M9, using the ROW signal functioning as a Word-line. Latch 32a consists of two cross-coupled inverters, M5/M6 and M7/M8, which permit two stable states, that include a state 1 when Node A is high and Node B is low, and state 2 when Node A is low and Node B is high.

The mirror is driven by a voltage applied to the landing electrode, and is held at a predetermined deflection angle on the landing electrode. An elastic "landing chip" is formed on the landing electrode, which puts the landing electrode in contact with the mirror, and deflects the mirror toward the opposite direction when the deflection of the mirror is switched. The landing chip has the same potential as the landing electrode so as to prevent a possible short from the contact between the landing electrode and the mirror.

Each mirror formed on a device substrate has a square or rectangular shape with a length of 4 to 15 um on each side. In this configuration, a reflected light that is not purposefully applied for an image display is inadvertently generated by reflections through the gap between adjacent mirrors, which degrades the contrast of the image display. In order to overcome such problems, the mirrors are arranged on a single semiconductor wafer substrate with a layout that minimizes the gaps between the mirrors. One mirror device is generally designed to include an appropriate number of micromirrors wherein each one is manufactured as a deflectable mirror on the substrate that displays a pixel of an image. The appropriate number of elements for a display image complies with the display resolution standard according to VESA Standard defined by Video Electronics Standards Association or television broadcast standards. The pitch between the mirrors of the mirror device is 10 µm and the diagonal length of the mirror array is about 0.6 inches when the mirror device has a plurality of mirror elements corresponding to the WXGA (resolution: 1280 by 768) defined by VESA.

Switching between dual states, as illustrated by the control circuit in FIG. 1C, positions the micromirrors in an ON or an OFF angular orientation as shown in FIG. 1A. The brightness, i.e., the gray scales of a digitally controlled image system is determined by the length of time the micromirror stays in an ON position. The length of time a micromirror is in an ON position is controlled by a multiple bit word. FIG. 1D shows the "binary time intervals" when controlling micromirrors with a four-bit word. As shown in FIG. 1D, the time durations have relative values of 1, 2, 4, and 8 which in turn define the relative brightness for each of the four bits, where the "1" is least significant bit (LSB) and the "8" is the most significant bit. According to the control mechanism, the minimum controllable differences between gray scales for showing different levels of brightness are represented by the "least significant bit" that maintains the micromirror at an ON position.

For example, assuming n bits of gray scales, one time frame is divided into $2^n-1$ equal time periods. For a 16.7-millisecond frame period and n-bit intensity values, the time period is $16.7/(2^n-1)$ milliseconds.

Having established these times for each pixel of each frame, the pixel intensities are quantified such that black is 0 time period, 1 time period is the intensity level represented by the LSB, and the maximum brightness is $2^n-1$ time periods. Each pixel's quantified intensity determines its ON-time during a time frame. Thus, during a time frame, each pixel with a quantified value of more than 0 is ON for the number of time periods that correspond to its intensity. The viewer's eye integrates the pixel brightness so that the image appears the same as if it were generated with analogous levels of light.

For controlling deflectable mirror devices, the PWM applies data to be formatted into "bit-planes", with each bit-plane corresponding to a bit weight of the quantity of light. Thus, if the brightness of each pixel is represented by an n-bit value, each frame of data has the n-bit-planes. Then, each bit-plane has a 0 or 1 value for each display element. According to the PWM scheme as described in the preceding paragraphs, each bit-plane is separately loaded and the display elements are controlled on the basis of bit-plane values corresponding to the value of each bit within one frame. For example, the bit-plane according to the LSB of each pixel is displayed as 1 time period.

When adjacent image pixels have very coarse gray scales caused by differences in brightness, artifacts become visible between these adjacent image pixels, degrading the quality of the displayed image. The degradation of displayed image quality is especially pronounced in the bright areas of images where there are "bigger gaps" in the gray scale, i.e. brightness, between adjacent image pixels. These gaps are the result of the digitally controlled image's inability to obtain sufficient brightness levels.

The mirrors are controlled at either the ON or OFF position. Then, the brightness of a displayed image is defined by the length of time each mirror remains at the ON position. In order to increase the levels of brightness, the switching speed of the ON and OFF positions for the mirror is increased. Therefore, the digital control signals need a higher number of bits. However, when the switching speed of the mirror deflection is increased, a stronger hinge is needed to support the mirror, and to sustain the required number ON and OFF positions for the mirror deflection. Furthermore, in order to drive the mirrors' hinge toward the ON or OFF positions, the electrode requires a higher voltage. The higher voltage may be as high as thirty volts. The mirrors produced by the CMOS technology may not be suitable for such a high range of voltages, therefore requiring the use of the DMOS mirror devices. To produce the DMOS mirror and control the higher gray scale, a more complicated production process and larger device areas are required. In order to gain the benefits of a smaller image display apparatus, the accuracy of gray scales and the range of the operable voltage have to be sacrificed in conventional mirror controls.

There are many patents related to the control of quantity of light. These include U.S. Pat. Nos. 5,589,852, 6,232,963, 6,592,227, 6,648,476, and 6,819,064. There are further patents and patent applications related to different light sources. These include U.S. Pat. Nos. 5,442,414, 6,036,318 and Application 20030147052. Also, The U.S. Pat. No. 6,746,123 has disclosed particular polarized light sources that prevent the loss of light. However, these patents or patent applications do not provide an effective solution for attaining a sufficient gray scale in the digitally controlled image display system.

Furthermore, there are many patents related to a spatial light modulation that include the U.S. Pat. Nos. 2,025,143, 2,682,010, 2,681,423, 4,087,810, 4,292,732, 4,405,209, 4,454,541, 4,592,628, 4,767,192, 4,842,396, 4,907,862, 5,214,420, 5,287,096, 5,506,597, and 5,489,952. There are additional patented disclosures related to the image projection apparatuses. These patented disclosures include U.S. Pat. No. 5,214,420, U.S. Pat. No. 5,285,407, U.S. Pat. No. 5,589,852, U.S. Pat. No. 6,232,963, U.S. Pat. No. 6,592,227, U.S. Pat. No. 6,648,476, U.S. Pat. No. 6,819,064, U.S. Pat. No. 5,442,414, U.S. Pat. No. 6,036,318, United States Patent Application 20030147052, U.S. Pat. No. 6,746,123, U.S. Pat. No. 2,025,143, U.S. Pat. No. 2,682,010, U.S. Pat. No. 2,681,423, U.S. Pat. No. 4,087,810, U.S. Pat. No. 4,292,732, U.S. Pat. No. 4,405,209, U.S. Pat. No. 4,454,541, U.S. Pat. No. 4,592,628, U.S. Pat. No. 4,767,192, U.S. Pat. No. 4,842,396, U.S. Pat. No. 4,907,862, U.S. Pat. No. 5,214,420, U.S. Pat. No. 5,287,096, U.S. Pat. No. 5,506,597, and U.S. Pat. No. 5,489,952. However, these inventions do not provide a direct solution to overcome the above-discussed limitations and difficulties.

In view of the above problems, an invention has disclosed a method for controlling the deflection angle of the mirror to express higher gray scales of an image in US Patent Application 20050190429. According to this method, the quantity of light obtained during the oscillation period of the mirror is about 25% to 37% of the emission light intensity for a mirror that is controlled under a constant ON-state.

With this method there is no particular need to drive the mirror in high speed, making it possible to obtain a high level of gradation with a low spring constant in the spring member supporting the mirror, which allows for a reduction in drive voltage. A display image that uses the mirror device described above is broadly categorized into two types, i.e. a single-plate equipped with only one spatial light modulator and a multi-plate equipped with a plurality of spatial light modulators. In the single-plate, changing colors in turn displays a color image, i.e., the frequency or wavelength of projected light is changed by time. In the multi-plate, a color image is displayed when the spatial light modulators corresponding to different colored beams of light, i.e. frequencies or wavelengths of the light, modulate the beams of light; and are constantly combined with them.

Specifically, each micromirror device is separately controlled within one frame or one sub-frame period. For example, it is possible to control some mirrors under the ON light state for a longer period than other mirrors. This differentiates the brightness of each mirror element (i.e., the product between the intensity of the ON light and the period of the ON light state) during one frame or one sub-frame period. Separately controlling each mirror element causes each mirror to shift from the deflection angle of the ON light state to that of the OFF light state in accordance with the period in which each mirror element reflects the ON light.

Each mirror element that shifts when light is irradiated causes some mirror elements to reflect the light unstably, generating a blur in motion images. Moreover, a continuous ON position for a light source that is comprised in a projection apparatus that irradiates light onto the mirror device heats it up, and increases power consumption.

SUMMARY OF THE INVENTION

In consideration of the above described problems, one aspect of the present invention is to remove the unstable reflection of incident light caused when each mirror element is shifted during one frame or sub-frame A first exemplary embodiment of the present invention provides a projection apparatus, includes a mirror device that includes a first electrode part and a second electrode part, an elastic hinge placed between the first electrode part and second electrode part, a mirror that is supported by the elastic hinge and that is deflected with a first coulomb force generated between the mirror and first electrode part and with a second coulomb force generated between the mirror and second electrode part; and a light source for emitting illumination light to be reflected by the mirror, wherein the light source suppresses the emission of the illumination light during a period in which the mirror performs a series of operations to shift from a non-deflection state, placing the mirror in a stationary and non-deflection state, to a predetermined deflection state.

A second exemplary embodiment of the present invention provides the projection apparatus according to the first exemplary embodiment, wherein the electric potential at the first electrode part is the same as the potential at the second electrode part.

A third exemplary embodiment of the present invention provides the projection apparatus according to the second exemplary embodiment, wherein the first electrode part and the second electrode part form a single drive electrode.

A fourth exemplary embodiment of the present invention provides the projection apparatus according to the second exemplary embodiment, wherein the mirror includes the non-deflection state, a first deflection state in which the mirror is stationary in the state of being deflected by the first coulomb force that is larger than the second coulomb force, and a second deflection state in which the mirror is stationary in the state of being deflected by the second coulomb force that is larger than the first coulomb force, wherein the predetermined deflection state is the second deflection state, wherein the first coulomb force is larger than the second coulomb force if the electric potential is set higher than the electric potential in the non-deflection state when the mirror is in the aforementioned non-deflection state.

A fifth exemplary embodiment of the present invention provides the projection apparatus according to the fourth exemplary embodiment, wherein the area size of the surface of the first electrode part in which the first coulomb force is generated is larger than the area size of the surface of the second electrode part in which the second coulomb force is generated.

A sixth exemplary embodiment of the present invention provides the projection apparatus according to the fourth exemplary embodiment, wherein the permittivity of the first electrode part is smaller than that of the second electrode part.

A seventh exemplary embodiment of the present invention provides the projection apparatus according to the fourth exemplary embodiment, wherein the series of operations is an operation for shifting to the second deflection state after shifting to the first deflection.

A eighth exemplary embodiment of the present invention provides the projection apparatus according to the first exemplary embodiment, wherein the mirror device further comprises a main power supply, wherein the series of operations is carried out after the main power supply is turned on.

A ninth exemplary embodiment of the present invention provides the projection apparatus according to the first exemplary embodiment, wherein the mirror device is controlled with externally inputted image data, and the series of operations is carried out after completing display of each frame of the image data.

A tenth exemplary embodiment of the present invention provides the projection apparatus according to the first exemplary embodiment, wherein the light source suppresses the emission of the illumination light during a period in which the mirror performs the series of operations.

An eleventh exemplary embodiment of the present invention provides a control method used for a projection apparatus includes a mirror device for which the deflection state that a mirror can be deflected to from a non-deflection state in which the mirror is not deflected is limited to a specific deflection state that is different from a desired deflection state, and a light source for emitting illumination light to be reflected by the mirror device, includes: suppressing the illumination light emitted from the light source or maintaining the suppressed state in the non-deflection state; deflecting the mirror to place it in the specific deflection state; deflecting the mirror to place it in the desired deflection state; maintaining the mirror in the desired deflection state; and emitting the illumination light from the light source.

A twelfth exemplary embodiment of the present invention provides a control method used for a projection apparatus includes (i) and (ii), where (i) is a mirror device which includes a mirror, first and second electrode parts and an elastic hinge that is placed between the first and second electrode parts and that supports the mirror and for which the deflection state that a mirror can be deflected to from a non-deflection state in which the mirror is not deflected is limited to a specific deflection state that is different from a desired deflection state, and (ii) is a light source for emitting illumination light to be reflected by the mirror device, includes: suppressing the illumination light emitted from the light source or maintaining the suppressed state in the non-deflection state; applying a voltage to the first electrode and second electrode to deflect the mirror with the difference between a first coulomb force and a second coulomb force that is larger than the first coulomb force, where the first coulomb force is generated between the first electrode and the mirror, and the second coulomb force is generated between the second electrode and the present mirror, and thereby the mirror is put in the specific deflection state; eliminating the voltage to shift the mirror toward the desired deflection state by means of the restoring force of the elastic hinge; applying the voltage to put the mirror in the desired deflection state when the first coulomb force becomes larger than the second coulomb force as a result of applying the voltage; maintaining the mirror in the desired deflection state by continuing the application of the voltage; and emitting the illumination light from the light source.

A thirteenth exemplary embodiment of the present invention provides the control method used for a projection apparatus according to the twelfth exemplary embodiment, wherein the voltage applied to the first electrode is equal to the voltage applied to the second electrode.

BRIEF DESCRIPTION OF THE DRAWINGS

The present invention is described in detail below with reference to the following Figures.

FIG. 1A is a functional block diagram showing the configuration of a projection apparatus according to a conventional technique.

FIG. 1B is a top view for showing the configuration of a mirror element of the projection apparatus according to a conventional technique.

DESCRIPTION OF THE PREFERRED EMBODIMENTS

[Outline of the Device]

Figure 1C:
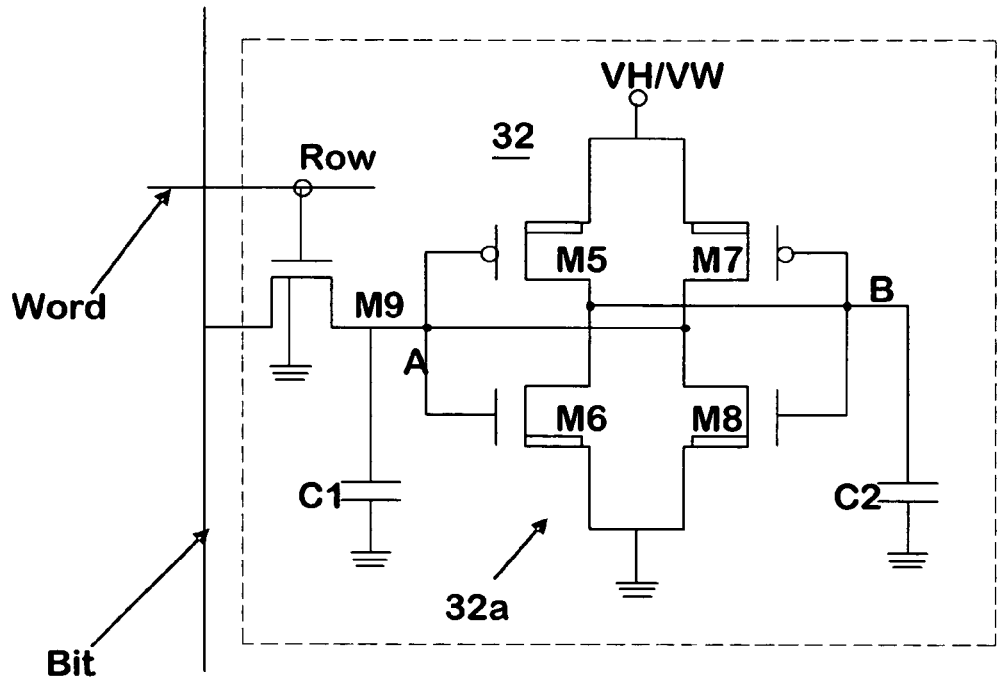
FIG. 1C is a circuit diagram for showing the circuit configuration of the drive circuit of a mirror element of the projection apparatus according to a conventional technique.
Figure 1D:
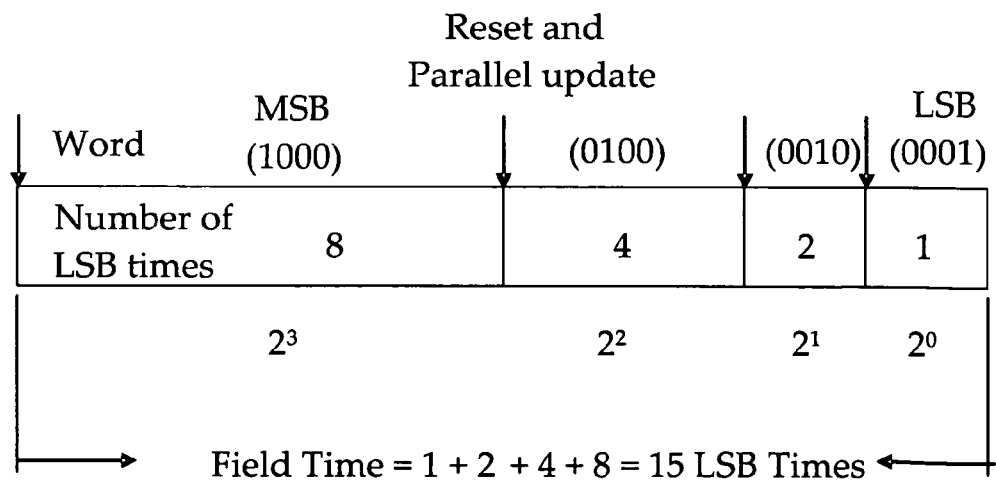
FIG. 1D is a timing diagram for showing the mirror control time schemes according to the image format used in a projection apparatus according to a conventional technique.

The following description is for a mirror device implemented as a spatial light modulator (SLM) in an image projection apparatus. It is widely known to implement different kinds of spatial light modulators (SLM), such as a transmissive liquid crystal, a reflective liquid crystal, a mirror array, etc. in the image projection apparatuses.

A spatial light modulator (SLM) includes a two-dimensional array that arranges, enlarges, and then displays on a screen by way of a projection lens arrayed as tens of thousands to millions of miniature modulation elements for projecting individual pixels corresponding to an image.

Generally, there are primarily two types of spatial light modulators implemented in the projection apparatuses. These two types are: 1) a liquid crystal device for modulating the polarizing direction of incident light by applying a control voltage to the liquid crystal sealed between transparent substrates, and 2) a mirror device that deflects miniature micro electro mechanical systems (MEMS) mirrors with electrostatic force and controls the reflecting direction of illumination light.

[Outlines of Mirror Size and Resolution]

Next is an outline description of the size of a mirror and the resolution.

The size of the MEMS mirrors for a mirror device is between 4 μm and 10 μm on each side. The mirrors are placed on a single semiconductor wafer substrate and arranged according to a configuration to minimize the gap between adjacent mirrors to prevent excess reflected light from the gap for reducing the degradation of the contrast for a modulated image. The mirror device for an image display apparatus comprises appropriate number of mirror elements to function as the image display elements. The appropriate number of image display elements will be determined in compliance with the resolution specified by the Video Electronics Standards Association (VESA) and the television Broadcasting standard. In the case of a mirror device comprising the number of mirror elements compliant to the WXGA (with the resolution of 1280×768) specified by the VESA, and in which mirrors are arrayed in intervals (noted as "pitch" hereinafter) of 10 μm, a sufficiently miniature mirror device is configured with about 15.49 mm (0.61 inches) of the diagonal length of the display area.

[Outline of Projection Apparatus]

Next is an outline description of the configuration of a projection apparatus.

There are primarily two types of deflection-type ("deflectable") light modulators implemented in the projection apparatuses. These two types are: 1) a single-panel projection apparatus that comprises a single spatial light modulator, changing the frequency of a projection light in time series and displaying an image in colors, and 2) a multi-panel projection apparatus that comprises a plurality of spatial light modulators, modulating an illumination light with different frequencies constantly by means of the individual spatial light modulators and displaying an image in colors by synthesizing these modulated lights.

[Outline of the Introduction of Laser Light Source]

Figure 2A:
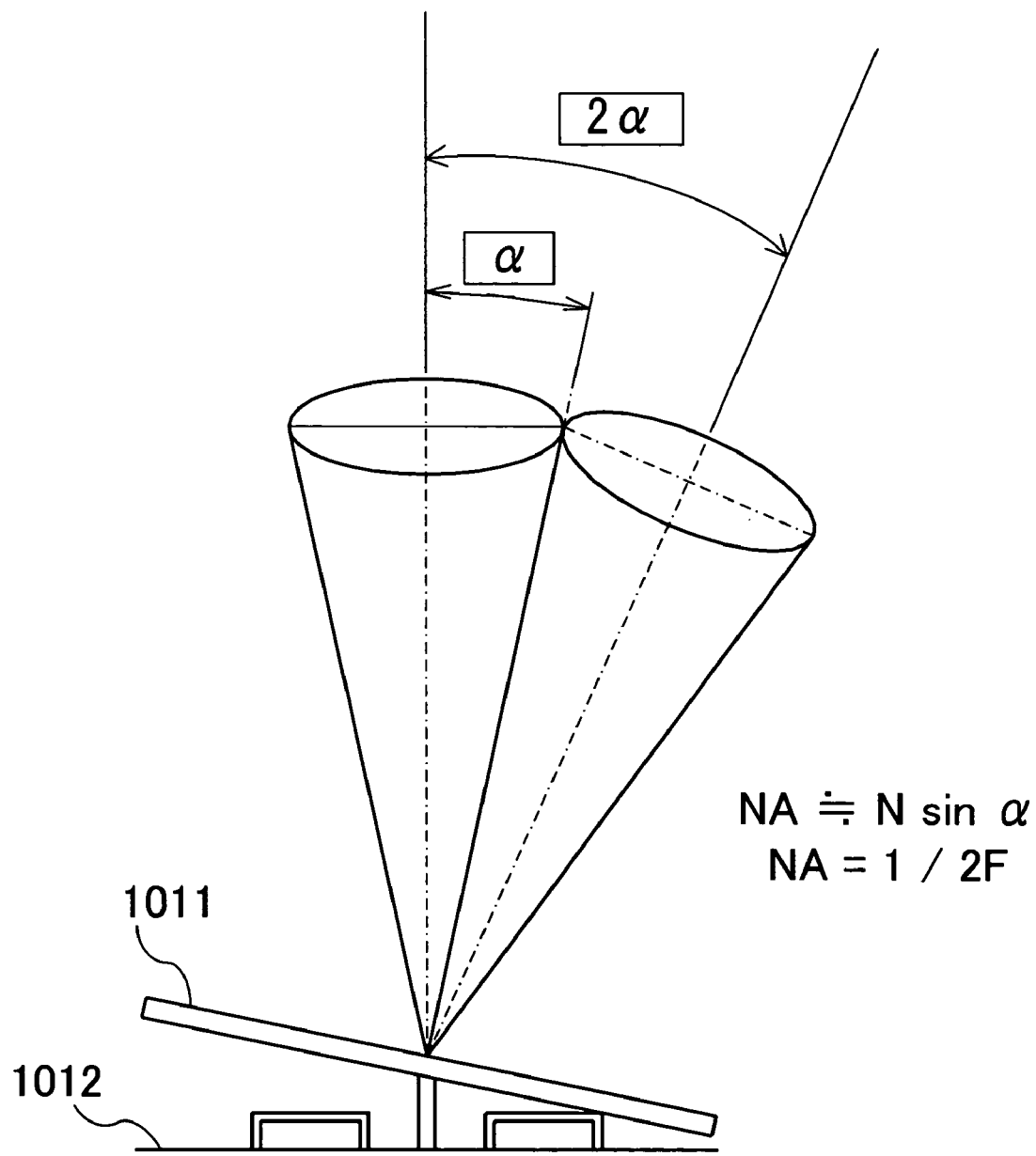
FIG. 2A is a cross sectional view for showing the relationship between the numerical aperture NA1 of an illumination light path, the numerical aperture NA2 of a projection light path, and the tilt angle α of a mirror.

Here follows an introductory description of a laser light source. There is a close relationship among the numerical aperture (NA) NA1 of an illumination light path, the numerical aperture NA2 of a projection light path, and the tilt angle α of a mirror in the projection apparatus implemented with the above-described mirror device as a reflective spatial light modulator. FIG. 2A shows the relationship between these parameters.

For the discussion of the exemplary embodiment, it is assumed that the tilt angle α of a mirror 1011 is 12 degrees. When a modulated light reflected by the mirror 1011 and incident to the pupil of the projection light path is set perpendicular to the device substrate 1012, the illumination light is incident from a direction inclined by 2α, that is, 24 degrees, relative to the perpendicular of the device substrate 1012. In order to most efficiently project the light beam reflected by the mirror to the pupil of the projection lens, it is desirable that the numerical aperture of the projection light path be equal to the numerical aperture of the illumination light path. If the numerical aperture of the projection light path is smaller than that of the illumination light path, the illumination light cannot be sufficiently imported into the projection light path; if the numerical aperture of the projection light path is larger that that of the illumination light path, the illumination light can be entirely transmitted. In the latter case, the projection lens then becomes unnecessarily large, which makes configuring the projection apparatus inconvenient. Furthermore, the light fluxes of the illumination light and projection light must be separate because the optical members of the illumination system and those of the projection system must be kept separate. With the above considerations in mind, when a spatial light modulator with mirror tilt angle of 12 degrees is used, the numerical aperture (NA) NA1 of the illumination light path and the numerical aperture NA2 of the projection light path are preferred to be set as follows:

$$NA1=NA2=\sin \alpha=\sin 12°$$

Let F1 be the aperture number of the illumination light path and F2 be the aperture number of the projection light path, then the numerical aperture can be converted a product of F as follows:

$$F1=F2=1/(2*NA)=1/(2*\sin 12°)=2.4$$

In order to maximize the projection of the illumination light emitted from a light source possessing non-directivity in the direction of the emitted light such as a high-pressure mercury lamp or a xenon lamp, which are generally used for projection apparatuses, the angle of light projecting on the illumination light path must be maximized. Since the numerical aperture of the illumination light path is determined by the specification by the tilt angle of a mirror, the tilt angle of the mirror needs to be large in order to increase the numerical aperture of the illumination light path.

Increasing the deflection angle of mirror, however, increases the drive voltage for the mirror. To increase the deflection angle of mirror, a long distance between the mirror and a driving electrode is required, because it is necessary to secure a physical space to tilt the mirror. It is possible to increase the drive voltage to compensate for the decrease in the drive force due to an increase in distance. However, the drive voltage is conventionally about 5 to 10 volts in a drive circuit of a CMOS process used for driving a mirror and, therefore, a relatively special process, such as a DMOS process, is required if a drive voltage in excess of about 10 volts and that would significantly increase the production costs.

On the other hand, for the purposes of cost reduction, it is desirable to obtain as many mirror devices as possible from a single semiconductor wafer substrate, since this would be an improvement of productivity. That is, a reduction of the pitch between mirror elements reduces the size of the mirror device. A decrease in mirror size results in a reduction in the area of the electrode, which, in turn, requires lower driving power.

Figure 2B:
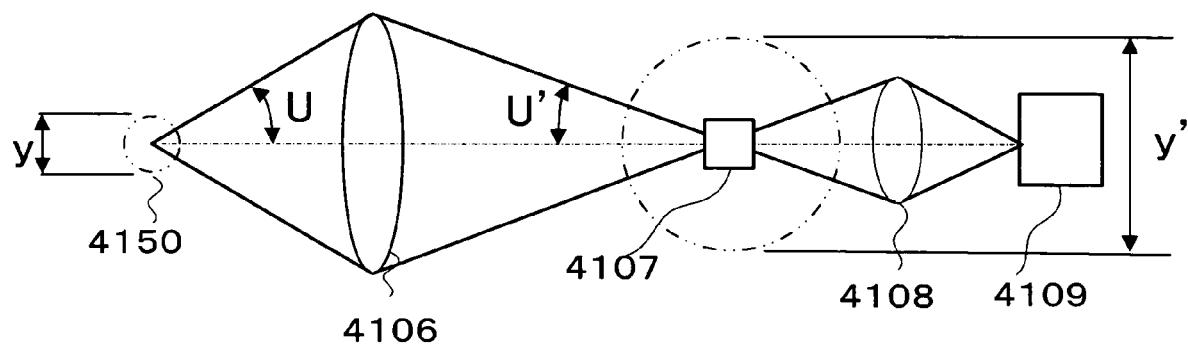
FIG. 2B is a diagram for illustrating the etendue in the case of using a discharge lamp light source and projecting an image by way of an optical device.

In contrast, a mirror device is able to produce brighter illumination only if a conventional lamp is used. Yet the usage of a conventional lamp with a non-directivity in its emission substantially reduces the efficiency of light usage. This is attributable to a relationship commonly called entendue. FIG. 2B is an illustrative diagram for describing etendue by illustrating the use of an arc discharge lamp light source and projecting an image by way of an optical device.

As shown in FIG. 2B, "y" is the size of a light source 4150, and "u" is the importing angle of light on the light source side. Further, "u'" is the converging angle on the image side, and "y'" is the size of the image of a light source, the relationship among these is represented by the following equation:

$$y*u=y'*u'$$

The above equation shows that the smaller the device on which a light source is intended to be imaged, the smaller the importing angle on the light source becomes. This is why it is advantageous to use a laser light source, wherein emission light possesses strong directivity, in order to allow for a decrease in mirror size.

[Outline of Oscillation Control]

Here follows a description of an oscillation control.

Another method for reducing the drive voltage, other than minimizing the tilt angle of a mirror, is disclosed in US Patent Application 20050190429. According to this method, a mirror is put into free oscillation in the inherent oscillation frequency, and the intensity of light during the oscillation period of the mirror is thereby reduced to about 25% to 37% of the emission light intensity for a mirror that is controlled under a constant ON-state.

According to this method, there is no particular need to drive the mirror in high speed, making it possible to obtain a high level of gradation with a low spring constant in the spring member supporting the mirror, which allows for a reduction in the drive voltage.

As described above, the adoption of a light source with directivity, such as a laser light source, makes it possible to reduce the deflection angle of a mirror and the size of the mirror device without decreasing the brightness of the light source. Furthermore, such a light source improves gradation without requiring an increase drive voltage if employed with the above described oscillation control.

However, the space usage efficiency of an electrode can be degraded if the electrode of a driving mirror and stopper, which defines the deflection angle of the mirror, is individually configured as in the conventional method. U.S. Pat. No. ("USP" hereinafter) 5,583,688, USP Application 20060152690, U.S. Pat. No. 6,198,180 or U.S. Pat. No. 6,992,810 have disclosed a structure for regulating the modulation angle of a mirror of a conventional mirror device. Any of the disclosed examples have a structure that faces the difficulty of increasing the size of an address electrode.

Embodiment 1

The following is a description, in detail, of the preferred embodiment of the present invention with reference to the accompanying drawings.

Figure 3:
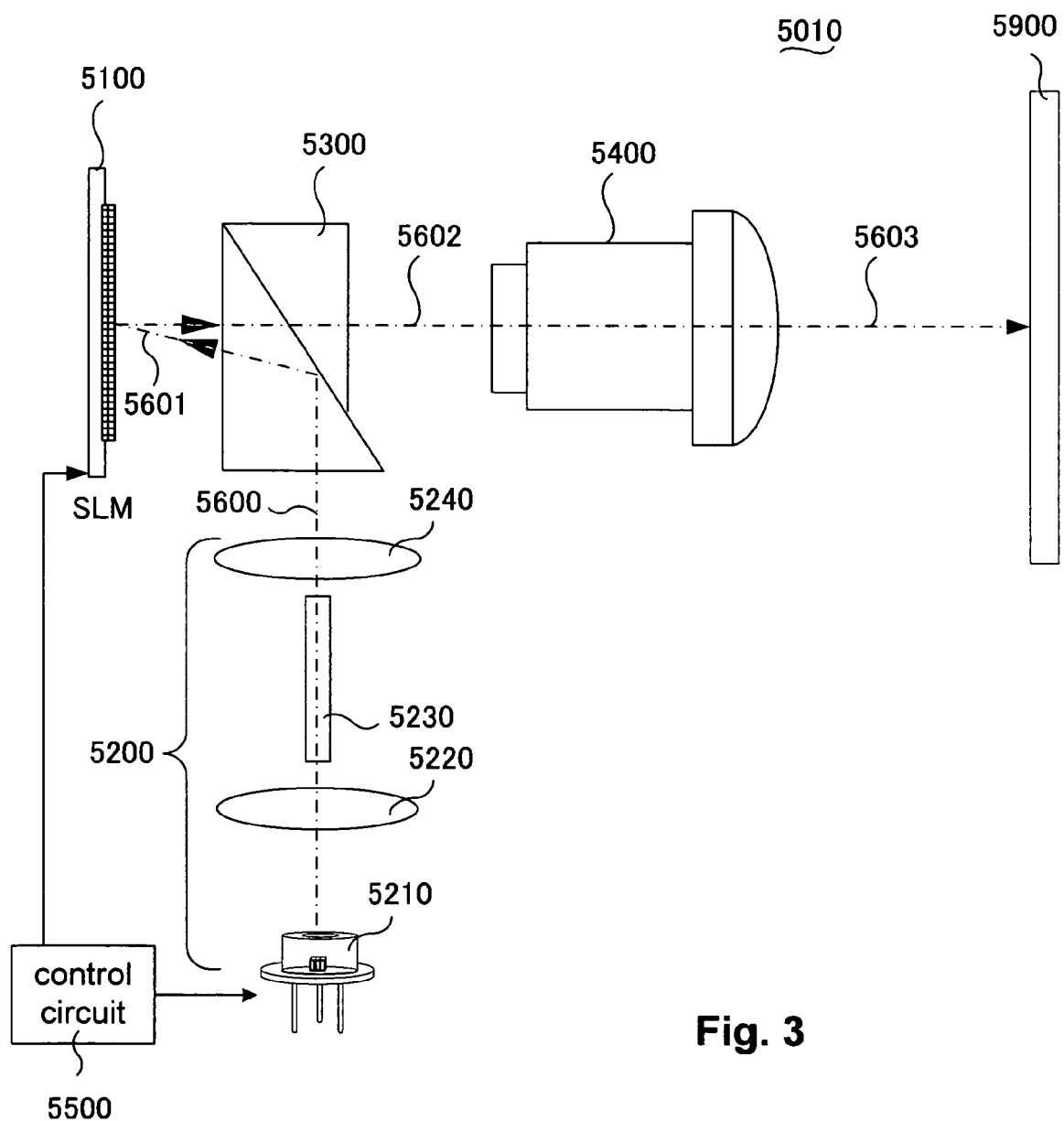
FIG. 3 is a functional block diagram for showing the configuration of a projection apparatus according to a preferred embodiment of the present invention.

FIG. 3 is a functional block diagram for showing the configuration of a projection apparatus according to a preferred embodiment of the present invention.

A projection apparatus 5010 according to the present embodiment comprises a single spatial light modulator (SLM) 5100, a control unit 5500, a Total Internal Reflection (TIR) prism 5300, a projection optical system 5400 and a light source optical system 5200 as exemplified in FIG. 3. The projection apparatus 5010 is a single-panel projection apparatus 5010 comprising a single spatial light modulator 5100. The projection optical system 5400 is implemented with the spatial light modulator 5100 and a TIR prism 5300 in the optical axis of the projection optical system 5400, The projection optical system 5400 further includes a light source optical system 5200 with a mutually aligned optical axis.

The TIR prism 5300 receives an illumination light 5600 transmitted from the light source optical system 5200 to project the light to the spatial light modulator 5100 at a prescribed inclination angle as an incident light 5601. The SLM 5100 reflects a reflection light 5602 to transmit to the projection optical system 5400. The projection optical system 5400 projects the reflection light 5602 transmitted from the spatial light modulator 5100 and TIR prism 5300 onto a screen 5900 as projection light 5603. The light source optical system 5200 comprises a adjustable light source 5210 for generating the illumination light 5600, a condenser lens 5220 for focusing the illumination light 5600, a rod type condenser body 5230 and a condenser lens 5240. The adjustable light source 5210, condenser lens 5220, rod type condenser body 5230 and condenser lens 5240 are arranged in the aforementioned order on the optical axis of the illumination light 5600, which is emitted from the variable light source 5210 and incident to the side face of the TIR prism 5300. The projection apparatus 5010 employs a single spatial light modulator 5100 for projecting a color image display on the screen 5900 by applying a color sequential image display technology. Specifically, the adjustable light source 5210, includes a red laser light source 5211, a green laser light source 5212, and a blue laser light source 5213 which are not specifically shown in FIG. 3. The adjustable light source allows independent controls for light emission states by dividing one frame of display data into sub-fields (i.e., three sub-fields, that is, red (R), green (G) and blue (B) in the present case) and causes the red laser light source 5211, the green laser light source 5212, and the blue laser light source 5213 each to emit their respective light during the time period corresponding to the sub-field of each color as described later.

Figure 4:
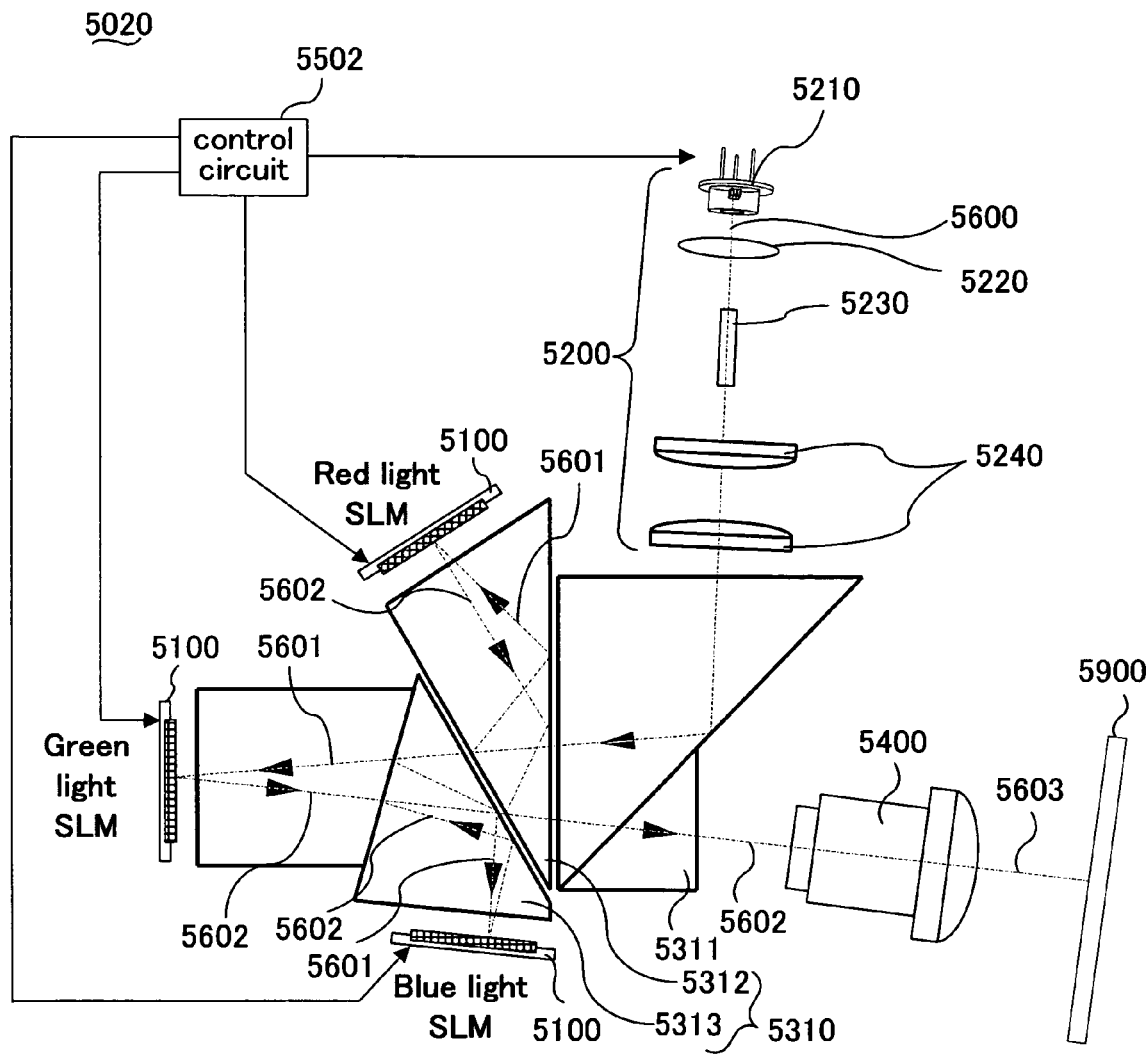
FIG. 4 is a functional block diagram showing the configuration of a multi-panel projection apparatus according to another preferred embodiment of the present invention.

FIG. 4 is a functional block diagram for showing a modification of the configuration of a projection apparatus according to the present invention. The projection apparatus 5020 is generally referred to as a multiple-plate projection apparatus comprising a plurality of spatial light modulators 5100, which is different from the above-described projection apparatus 5010. Furthermore, the projection apparatus 5020 comprises a control unit 5502 instead of the control unit 5500. The projection apparatus 5020 comprises spatial light modulators 5100, and further includes a light separation/synthesis optical system 5310 disposed between the projection optical system 5400 and each of the spatial light modulators 5100. The light separation/synthesis optical system 5310 further includes a TIR prism 5311, a prism 5312 and a prism 5313. The TIR prism 5311 has the function of directing the incident illumination light 5600 from the side of the optical axis of the projection optical system 5400 to the spatial light modulator 5100 as incident light 5601. The prism 5312 carries out the functions 1) of separating red (R) light from an incident light 5601 incident by way of the TIR prism 5311 and making the red light incident to the red light-use spatial light modulator 5100, and 2) directing the reflection light 5602 of the red light to the TIR prism 5311.

Likewise, the prism 5313 carried out the functions of 1) separating blue (B) and green (G) lights from the incident light 5601 incident by way of the TIR prism 5311 and projecting to the blue color spatial light modulators 5100, and 2) directing the reflection light 5602 of the green light and blue light to the TIR prism 5311.

Therefore, three spatial light modulators 5100 simultaneously modulate light of three colors of R, G and B and the resultant reflection lights with respective modulations are projected onto the screen 5900 as the projection light 5603 by way of the projection optical system 5400, and thus a color display is achieved. Note that various modifications are possible for a light separation/synthesis optical system as light separation/synthesis optical system 5310.

Figure 5A:
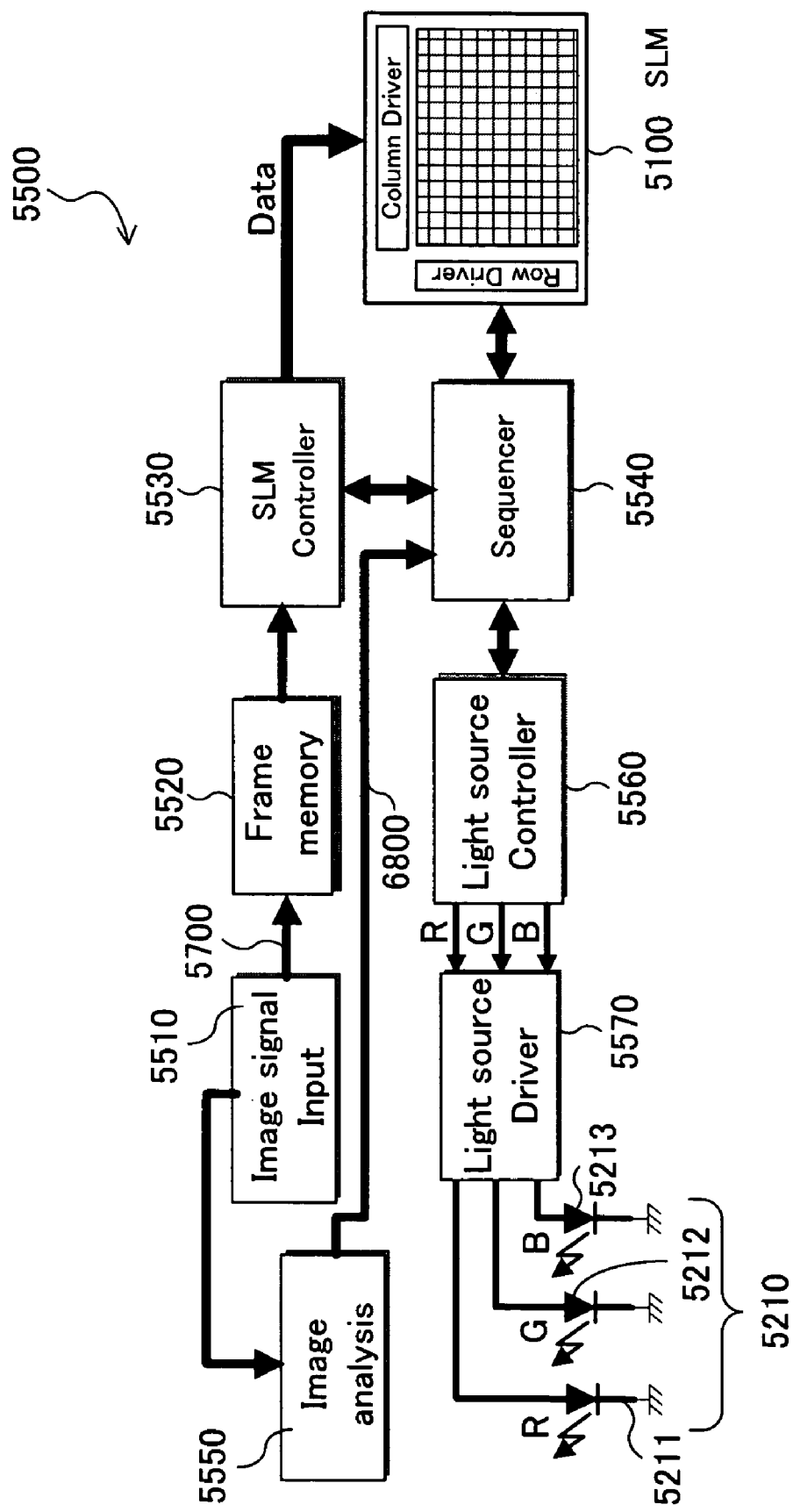
FIG. 5A is a block diagram for illustrating the configuration of a control unit comprising a single-panel projection apparatus according to a preferred embodiment of the present invention.

FIG. 5A is a block diagram for showing the configuration of the control unit 5500 as that implemented in the above described single-panel projection apparatus 5010. The control unit 5500 comprises a frame memory 5520, an SLM controller 5530, a sequencer 5540, a light source control unit 5560, and a light source drive circuit 5570. The sequencer 5540 comprises a microprocessor that controls operation timing and the control unit 5500 and spatial light modulators 5100. The frame memory 5520 retains one frame of digital video data input 5700 received from an external device (not shown in FIG. 5A), which is connected to a video signal input unit 5510. The digital video data input 5700 is updated, every time the display of one frame is completed. The SLM controller 5530 processes the digital video data input 5700 read from the frame memory 5520 as described later, separates the read data into sub-fields 5701 through 5703, and outputs the data to the spatial light modulators 5100 as binary data 5704 and non-binary data 5705, which are used for implementing an the ON/OFF control and oscillation control (which are described later) of a mirror 5112 of the spatial light modulator 5100. The binary data 5704 contains a pulse width in accordance with the weighing value of an individual bit. The non-binary data 5705 converted from the digital video data input 5700 becomes a bit string that includes continuous bits of "1" corresponding to the level of brightness, and in this bit stream of the non-binary data 5705 has the same weighting factor (e.g., "1"). The sequencer 5540 outputs a timing signal to the spatial light modulator 5100 synchronously with the generation of the binary data 5704 and non-binary data 5705 at the SLM controller 5530. The video image analysis unit 5550 outputs a video image analysis signal 5800 used for generating various light source patterns (which are described later) on the basis of the input digital video data 5700 received from the video signal input unit 5510. The light source control unit 5560 controls the operation of the variable light source 5210 by using a light source profile control signal to control the light source drive circuit 5570 for emitting the illumination light 5600. This light source profile control signal is generated from the video image analysis signal 5800 on the basis of the input of the video image analysis signal 5800 inputted from the video image analysis unit 5550 by way of the sequencer 5540 and generates light source pulse patterns. The light source drive circuit 5570 drives the red laser light source 5211, green laser light source 5212, and blue laser light source 5213 of the variable light source 5210 to emit light according to the light source pulse patterns received from the light source control unit 5560. The present embodiment illustrates the use of a laser light source; an alternative configuration may use a semiconductor light source that arrays light emitting diodes (LEDs) or the like.

The configuration shows the light source drive circuit 5570 drives and flexibly adjusts the laser light sources of the respective colors. An alternative configuration may be such that the light source drives the red laser light source 5211, green laser light source 5212 and blue laser light source 5213, respectively.

A configuration such that the adjustable light source 5210 comprises the red laser light source 5211, green laser light source 5212 and blue laser light source 5213 and each of these laser light sources is flexibly adjustable. An alternative configuration may be such that the adjustable light source 5210 is a single light source capable of emitting light containing all wavelengths corresponding to the respective colors of at least red (R), green (G) and blue (B).

Figure 5B:
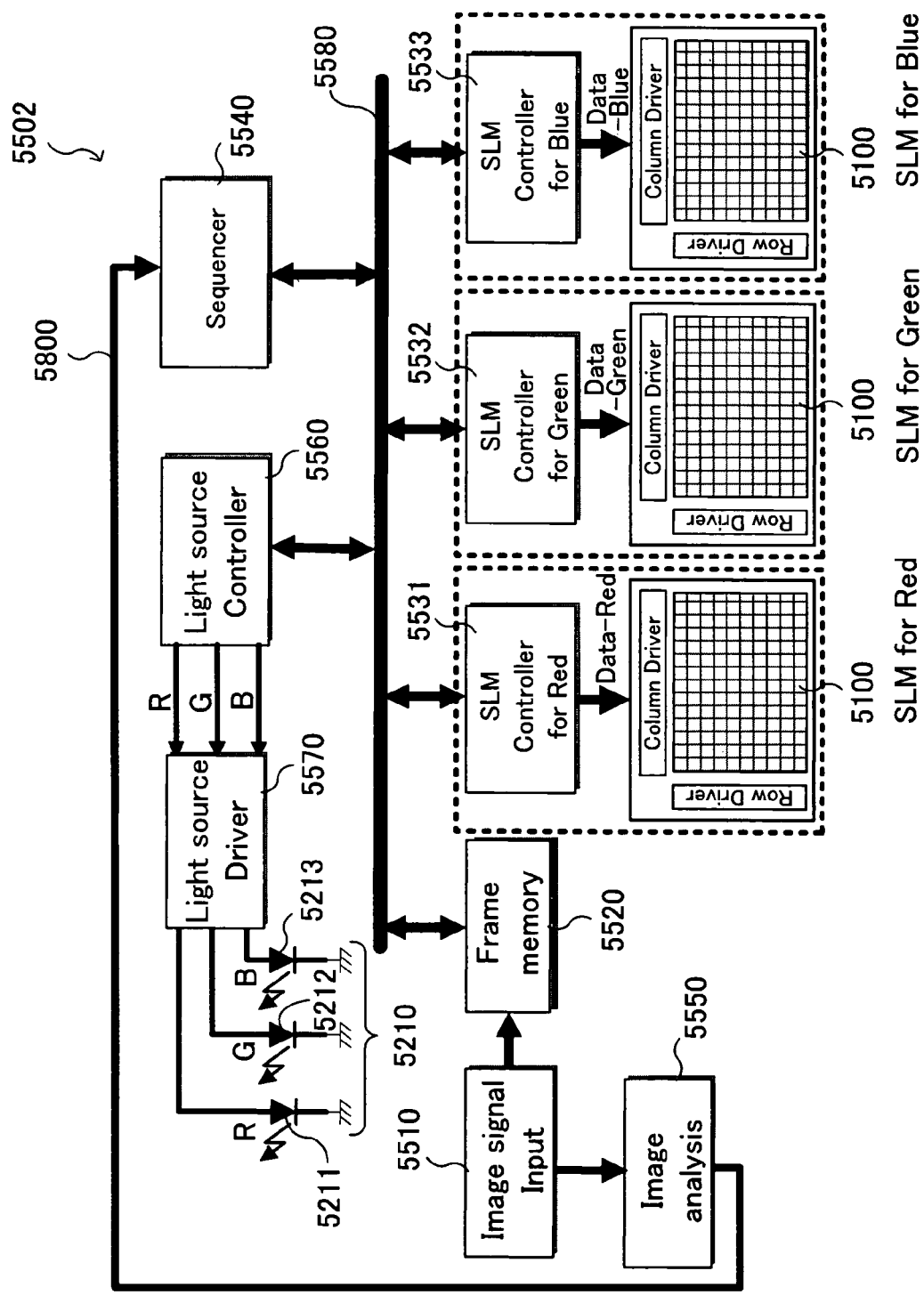
FIG. 5B is a side view for showing the configuration of another medication of a multi-panel projection apparatus according to a preferred embodiment of the present invention.

FIG. 5B is a block diagram for showing the configuration of the control unit of a multi-panel projection apparatus according to the present embodiment. The control unit 5502 comprises SLM controllers 5531, 5532 and 5533, which are used for controlling, respectively, the spatial light modulators 5100 for modulating the colors R, G and B, and the placement of the controllers is different from the above described control unit 5500, which is otherwise similar. Specifically, the SLM controller 5531, SLM controller 5532 and SLM controller 5533 corresponding to their respective color-use spatial light modulators 5100 are formed on the same substrates as those of the respective spatial light modulators 5100. This configuration makes it possible to place the spatial light modulators 5100 and the corresponding SLM controller (5531, 5532 and 5533) close to each other, thereby enabling a high speed data transfer rate. Further, a system bus 5580 connects the frame memory 5520, light source control unit 5560, sequencer 5540 and SLM controllers 5531 through 5533, in order to speed up and simplify the connection path of each connecting element.

The configuration shows a single light source drive circuit 5570 that flexibly controls and drives the laser light sources of the respective colors. An alternative configuration may include independent light source drive circuit to flexibly control and drive the red laser light source 5211, green laser light source 5212 and blue laser light source 5213, respectively.

Figure 6A:
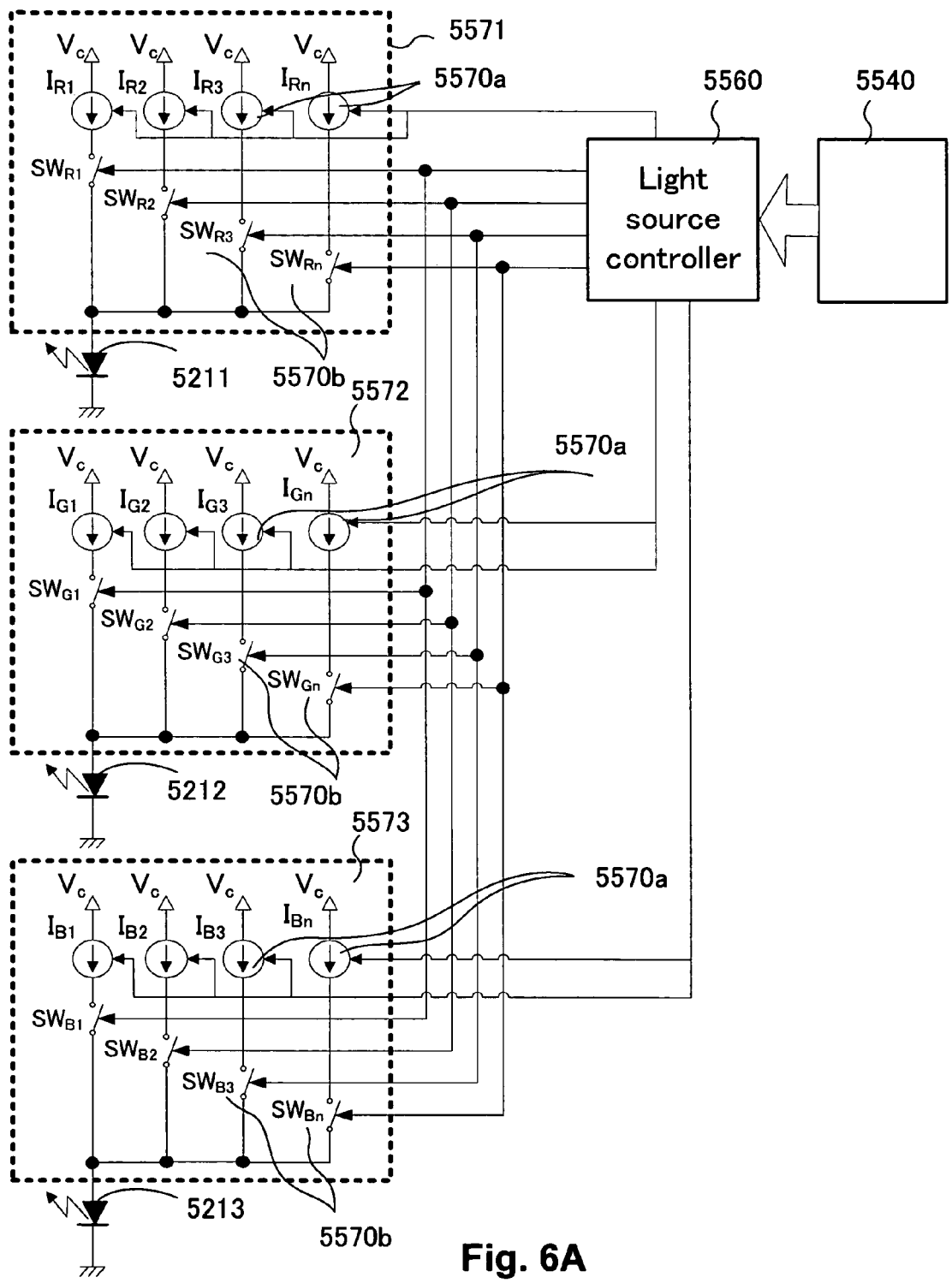
FIG. 6A is a block diagram illustrating the configuration of the light source drive circuit of a projection apparatus according to a preferred embodiment of the present invention.

The configuration illustrates adjustable a light source 5210 that includes flexibly adjustable red laser light source 5211, green laser light source 5212 and blue laser light source 5213. An alternative configuration may include adjustable light source 5210 implemented with a single light source for emitting light containing all wavelengths corresponding to the respective colors of at least red (R), green (G) and blue (B). This configuration makes it possible for a single chip SLM controller 5530 to control the spatial light modulators 5100, thereby reducing the size of the apparatus FIG. 6A is a schematic circuit diagram for illustrating the configuration of the light source drive circuit 5570 (i.e., the light source drive circuits 5571, 5572 and 5573) according to the present embodiment. The light source drive circuit as depicted in FIG. 6A comprises a plurality of constant current circuits 5570a (i.e., I (R, G, B)$_1$ through I (R, G, B)$_n$) which correspond to switching circuits 5570b (i.e., switching circuits SW (R, G, B)$_1$ through SW (R, G, B)$_n$), in order to obtain the desired light intensities of emission $P_1$ through $P_n$ for the variable light sources 5210 (i.e., the red laser light source 5211, green laser light source 5212 and blue laser light source 5213).

The switching circuit 5570b switches the variable light source 5210, i.e., red laser light source 5211, green laser light source 5212 and blue laser light source 5213, in accordance with the desired emission profile of the adjustable light source 5210. The initial values of the output current of the constant current circuits 5570a (i.e., constant current circuits I (R, G, B)$_n$), when the gray scale of the emission intensity of the variable light source 5210 is designated at N bits (where $N \geq n$), are as follows:

$$I(R,G,B)_1 = I_{th} + \text{LSB}$$

$$I(R,G,B)_2 = \text{LSB}+1$$

$$I(R,G,B)_3 = \text{LSB}+2$$

...

...

$$I(R,G,B)_n = \text{MSB}$$

This is an example of a gray scale display based on emission intensity. A similar gray scale display is achievable even if the emission period (i.e., an emission pulse width), emission interval (i.e., an emission cycle), is flexibly controllable.

The relationship between the emission intensity of the adjustable light source and drive current for each color in this case is as follows. Note that "k" is an emission efficiency corresponding to the drive current:

$$P_1 = k^*(I_{th}+I_1)$$

$$P_2 = k^*(I^{th}+I_1+I_2)$$

...

...

$$P_n = k^*(I_{th}+I_1+I_2+\ldots+I_{n-1}+I_n)$$

Figure 6B:
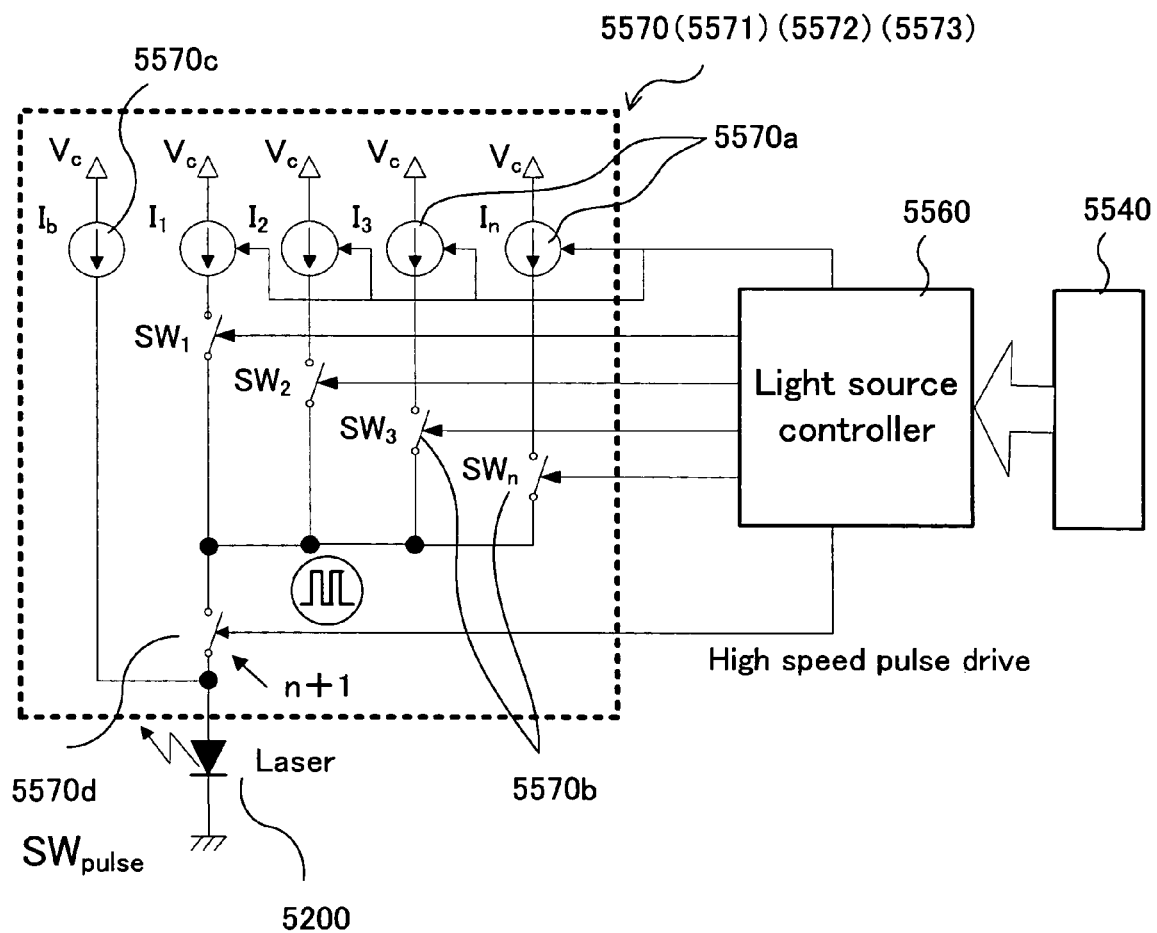
FIG. 6B is a block diagram for illustrating a modification of the configuration of the light source drive circuit of a projection apparatus according to a preferred embodiment of the present invention.

FIG. 6B is a schematic circuit diagram for showing an alternative configuration of the light source drive circuit as another exemplary embodiment of this invention. FIG. 6B, shows the constant current circuits 5570a (I (R, G, B)$_1$ through I (R, G, B)$_n$) as constant current circuits 5570a (I$_1$ through I$_n$) and the switching circuits 5570b (SW (R, G, B)$_1$ through SW (R, G, B)$_n$) as switching circuits 5570b (SW$_1$ through SW$_n$). As will be described below, the light source drive circuits 5570 according to the present embodiment is configured to make the individual constant current circuit 5570a (i.e., I (R, G, B)$_1$ in this case) to supply a bias current value equivalent to the threshold current $I_{th}$ of the variable light source 5210, or close to the threshold current when a single semiconductor laser is used as the variable light source 5210. This is because a high speed current drive is required to stabilize the switching operation of the light source drive circuits 5570 of the present embodiment and also to enable a high speed emission.

FIG. 6B shows the light source drive circuits 5570, i.e., the light source drive circuit 5571, light source drive circuit 5572, light source drive circuit 5573 comprises bias current circuits 5570c connected to the variable light source 5210. The light source 5210 includes the red laser light source 5211, green laser light source 5212 and blue laser light source 5213 applied with a bias current $I_b$, in addition to the constant current circuits 5570a. Furthermore, the constant current circuits 5570a are connected to the variable light source 5210 through a high speed switching circuit 5570d (SW$_{pulse}$) disposed on the downstream side of the switching circuits 5570b. According to the configuration shown in FIG. 6B, the relationship between the emission intensity P$_n$ and drive current of the variable light source for each wavelength is as follows, where "k" is the emission intensity in terms of drive current:

$$P_b = k^*I_b(I_b \approx I_{th})$$

$$P_1 = k^*(I_{th}+I_1)$$

$$P_2 = k^*(I_{th}+I_1+I_2)$$

...

...

$$P_n = k^*(I_{th}+I_1+I_2+\ldots+I_{n-1}+I_n)$$

Therefore, the relationship between each switching operation and emission output is as follows:

$$SW_{pulse}=\text{OFF}: P_b = k^*I_b \approx 0[\text{mW}] \text{ (where } I_b \approx I_{th})$$

$$SW_1: P_1 = k^*(I_b+I_1)$$

$$SW_2: P_2 = k^*(I_b+I_1+I_2)$$

...

...

$$SW_n: P_n = k^*(I_b+I_1+I_2+\ldots I_{n-1}+I_n)$$

This makes it possible to attain an emission profile with an emission intensity P$_b$ that is nearly zero. The use of the switching circuits 5570d illustrated in FIG. 6B makes it possible to implement a circuit operation unaffected by a drive current switching over caused by the switching circuits 5570b (SW$_1$ through SW$_n$) which are connected to the respective constant current circuits 5570a. Better image quality may be achieved if the switching circuits 5570b (SW$_1$ through SW$_n$) are switched over when the adjustable light source (i.e., the adjustable light source 5210) is not emitting light.

The configuration shown in FIG. 6B is provided with a fixed current value for the bias current value. It can alternatively be configured, however, with variable bias current by connecting the constant circuit 5570c to the light source control circuit 5560, so that the bias current is flexibly adjusted by the light source control circuit 5560 as will be further explained below.

Figure 7:
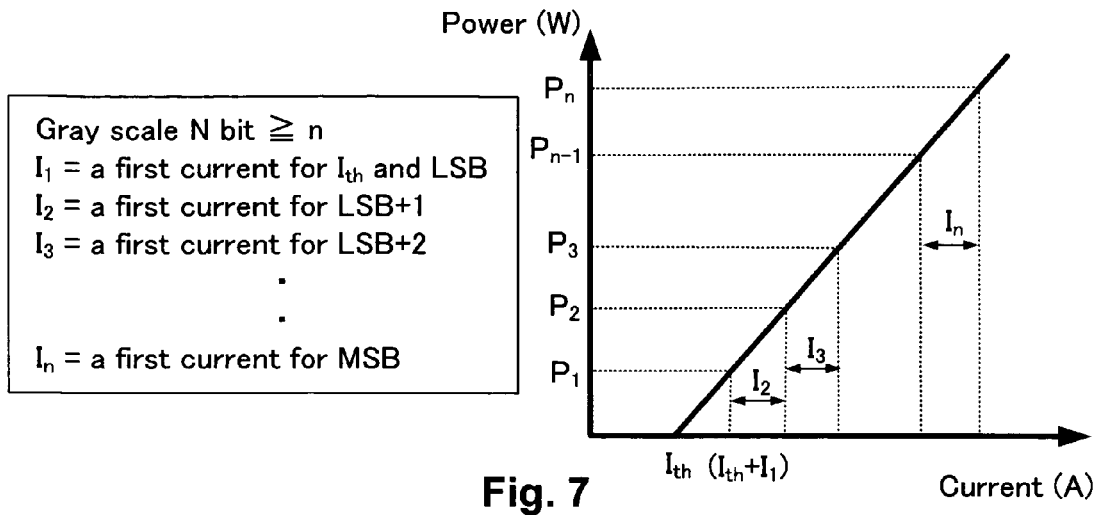
FIG. 7 is a diagram showing the relationship between the applied current and the emission light intensity of a light source drive circuit in the embodiment of the present invention.
Figure 8:
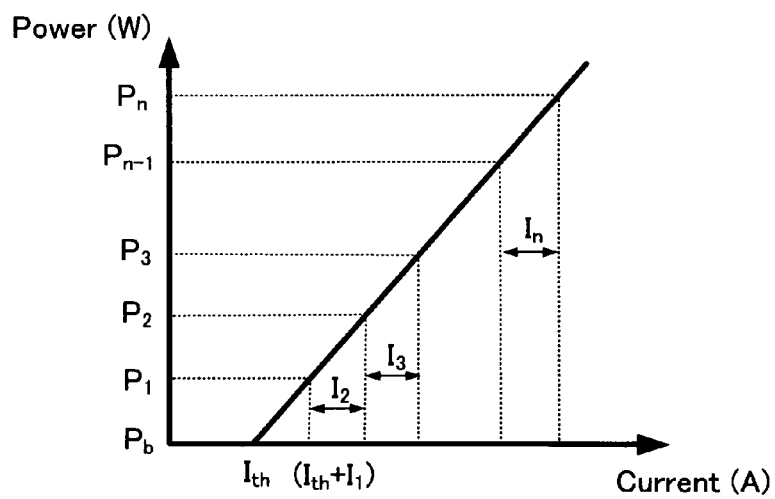
FIG. 8 is a diagram for showing the relationship between the emission light intensity and the current applied to the light source drive circuit according to the embodiment of the present invention.

FIG. 7 is a chart showing the relationship between the applied current I of the light source drive circuit shown in the above described FIG. 6A and the emission intensity P$_n$. FIG. 8 is a chart showing the relationship between the applied current I of the constant current circuit 5570a of the light source drive circuit shown in FIG. 6B and emission intensity P$_b$, emission intensity P$_n$. Note that the description for FIGS. 6A and 6B assume that the changes in the emission profiles of the adjustable light source for each sub-frame correspond to each gray scale bit. The display gray scale function of the spatial light modulator 5100 is used, the number of required levels of electrical current decreases, reducing the numbers of constant current circuits 5570a and switching circuits 5570b needed and making it possible to obtain the number of gray scales equal to, or higher than, the displayable gray scales of the spatial light modulator 5100.

Figure 9:
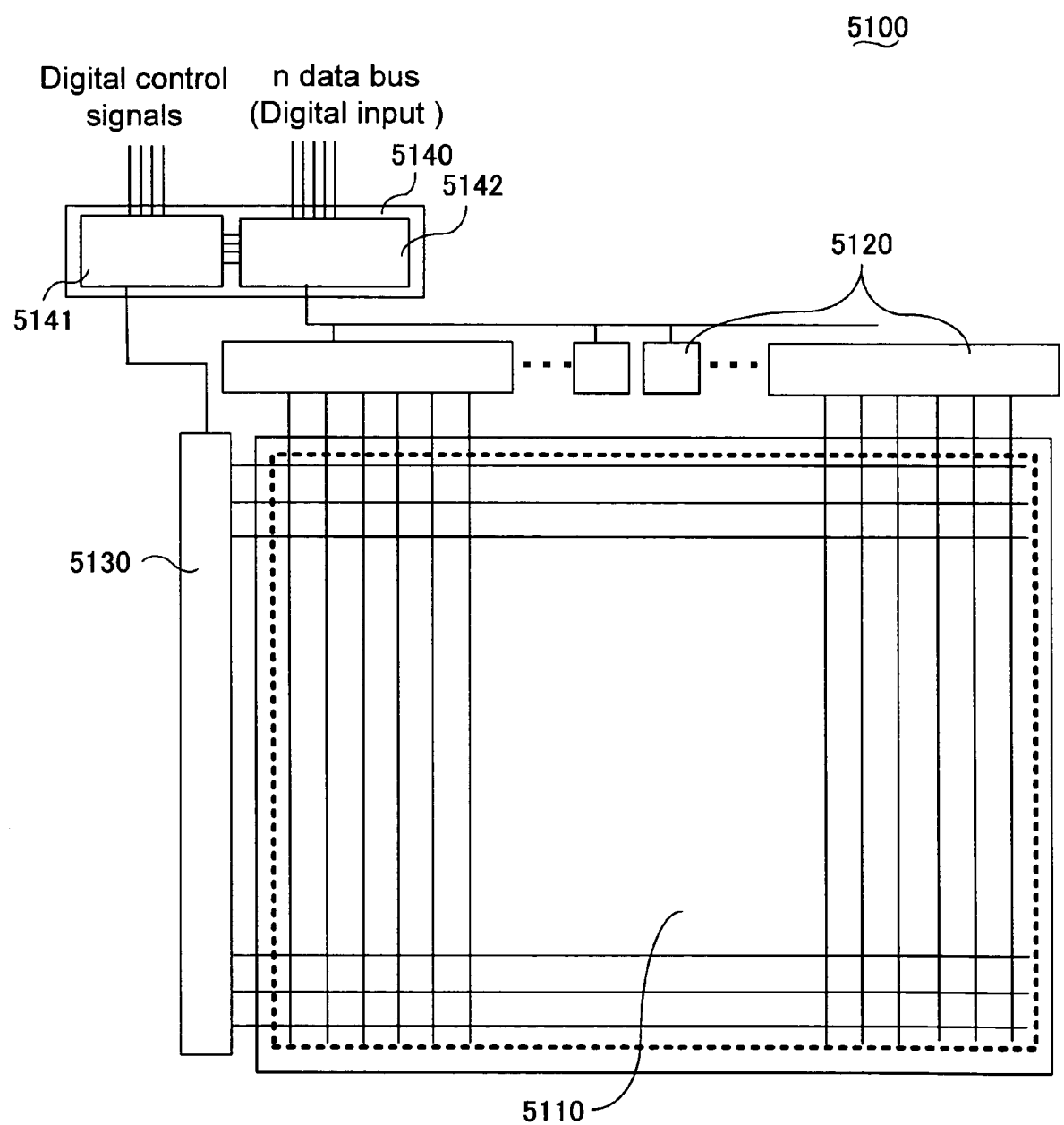
FIG. 9 is a schematic diagram for illustrating the layout of the internal configuration of a spatial light modulator according to the embodiment of the present invention.
Figure 10:
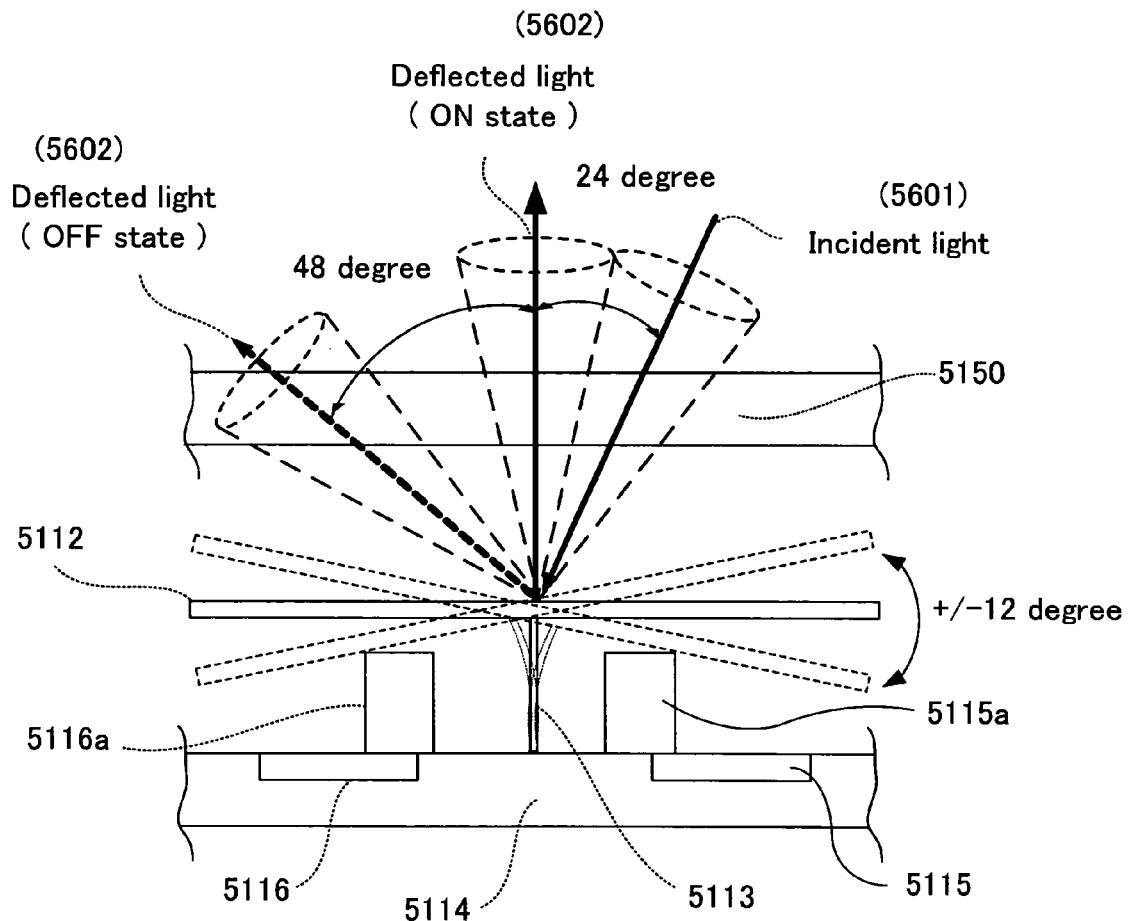
FIG. 10 is a cross-sectional diagram of an individual pixel unit constituting a spatial light modulator according to the embodiment of the present invention.
Figure 11:
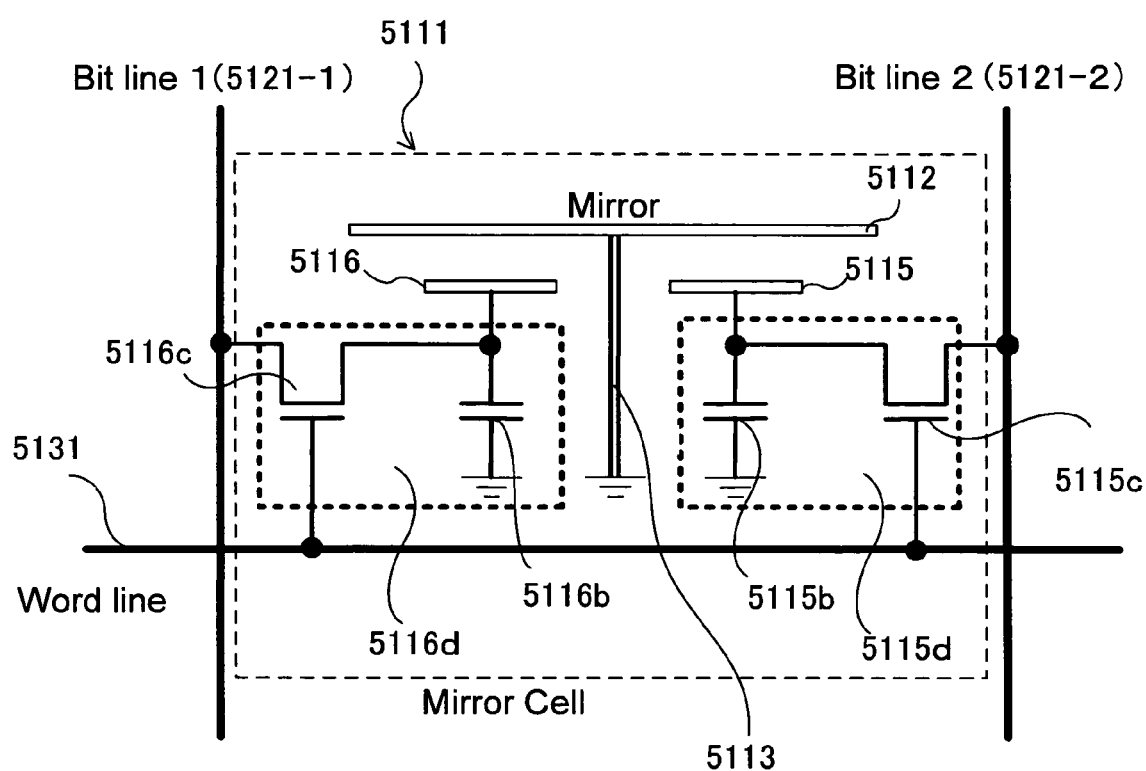
FIG. 11 is a side cross sectional diagram for illustrating the configuration of an individual pixel unit constituting a spatial light modulator according to the embodiment of the present invention.

FIG. 9 is a schematic circuit diagram for illustrating the layout of the internal configuration of the spatial light modulator 5100 according to the present embodiment. FIG. 10 is a cross-sectional diagram of an individual pixel unit constituting the spatial light modulator 5100 according to the present embodiment. FIG. 11 is a side cross sectional view for illustrating the individual pixel unit comprising the spatial light modulator 5100 according to the present embodiment.

As illustrated in FIG. 9, the spatial light modulator 5100 comprises a mirror element array 5110, column drivers 5120, ROW line decoders 5130 and an external interface unit 5140. The external interface unit 5140 includes a timing controller 5141 and a selector 5142. The timing controller 5141 controls the ROW line decoder 5130 based on a timing signal from the SLM controller 5530. The selector 5142 supplies the column driver 5120 with digital signal from the SLM controller 5530.

In the mirror element array 5110, the mirror elements are positioned where individual bit lines 5121, which extend vertically from the column drivers 5120, cross individual word lines 5131. The word lines 5131 extend horizontally from ROW decoders 5130.

As exemplified in FIG. 10, the individual mirror element 5112 tilts freely while supported by a hinge 5113 on substrate 5114. The mirror 5112 is covered with a cover glass 5150 for protection. An OFF electrode 5116 (and an OFF stopper 5116a) and an ON electrode 5115 (and an ON stopper 5115a) are formed symmetrically across the hinge 5113 on the substrate 5114. The OFF electrode 5116 draws the mirror 5112 with a Coulomb force by applying a predetermined voltage and tilts the mirror 5112 to contact with the OFF stopper 5116a. This causes the incident light 5601 projected to the mirror 5112 to reflect to the light path of alone an OFF direction away from the optical axis of the projection optical system 5400.

The ON electrode 5115 draws the mirror 5112 with a Coulomb force by applying a predetermined voltage and tilts the mirror 5112 to contact with the ON stopper 5115a. This causes the incident light 5601 incident to the mirror 5112 to reflect to the light path along an ON direction matching the optical axis of the projection optical system 5400.

A configuration that retains mirror 5112 by abutting the ON stopper 5115a or OFF stopper 5116a is one among several optional arrangements. An alternative configuration may eliminate the ON stopper 5115a or OFF stopper 5116a, thereby maintaining mirror 5112 by abutting the ON electrode 5115 or OFF electrode 5116.

As illustrated in FIG. 11, an OFF capacitor 5116b is connected to the OFF electrode 5116, and the OFF capacitor 5116b is connected to a bit line 5121-1 and a word line 5131 by way of a gate transistor 5116c. Furthermore, an ON capacitor 5115b is connected to the ON electrode 5115, and the ON capacitor 5115b is connected a bit line 5121-2 and a word line 5131 by way of a gate transistor 5115c. The signals received on the word line 5131 control the turning on and off of the transistors 5116c and 5115c. More specifically, the mirror elements 5111, which are on one horizontal row in line with an arbitrary word line 5131, are simultaneously selected, and the charging and discharging of the OFF capacitor 5116b and ON capacitor 5115b are controlled by bit lines 5121-1 and 5121-2, respectively. Thus, the ON and OFF states of the mirrors 5112 of the individual mirror elements are controlled.

Embodiment 2

A projection apparatus according to the present embodiment comprises a mirror device with mirror elements for modulating the incident light emitted from the light source and turns the reflection of the incident light to the ON state to direct it to a projection path or to the OFF state, so it is not directed to a projection path. Furthermore, the light source and mirror device are controlled by a pulse width modulation (PWM) in either a frame or a sub-frame. Within the time the mirror of maximum brightness (i.e., intensity of reflection light toward the projection path) reflects the incident light to the ON state, the other mirrors are no longer ON. Outside of that time, the light is turned off within one frame or sub-frame.

A sub-frame is defined as a piece of data assigned to each color, i.e., a light with specific wavelength when a plurality of incident lights is projected with different wavelengths for displaying different colors in sequence.

It is possible for a light source to be either a laser or a light emitting diode (LED), which are both capable of performing pulse emission. The pulse emission-capable light source enables synchronization with the mirror device. The mirror device is configured by arraying a plurality of mirror elements comprising both a deflectable mirror, which is supported by an elastic hinge formed on a substrate that reflects the incident light from the light source, and an address electrode placed on the substrate and under the mirror, as described above in FIGS. 10 and 11. Note that it is preferable to control the mirrors of the mirror device with non-binary data obtained by converting the binary data as shown in FIGS. 12, 13, 14 and 15.

Figure 12:
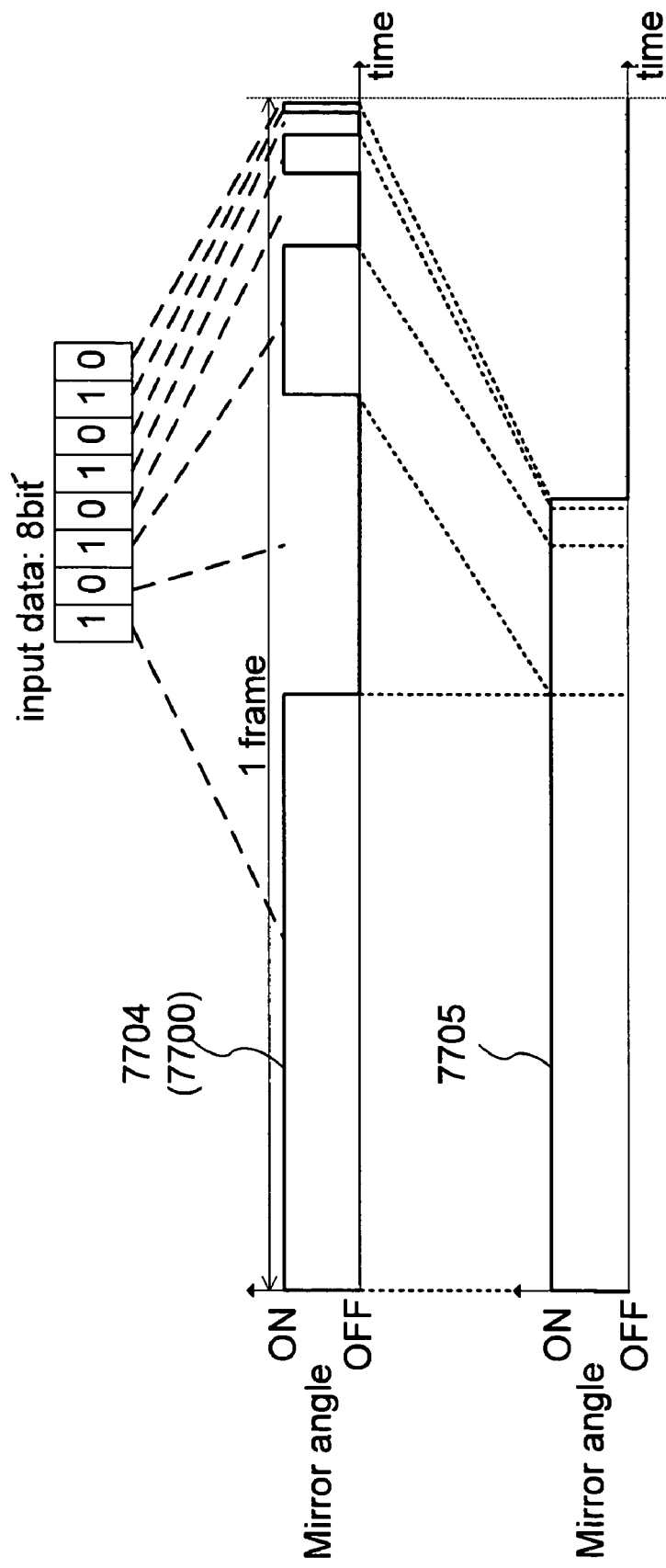
FIG. 12 is a chart illustrating a conversion from binary data to non-binary data performed in a projection apparatus according to the embodiment of the present invention.

The binary data 7704, comprising the 8-bit "10101010", generates the non-binary data 7705, which is a bit string that has equal weight for each digit, as illustrated in FIG. 12. A control turns ON the mirror 5112 for the period in which the bit string is continuous. As illustrated in FIG. 12, the non-binary data 7705 is converted so that the bit string is within the display period of one frame, and turns ON the mirror 5112 for a predetermined period in accordance with the bit string number from the beginning of a frame display period.

Figure 13:
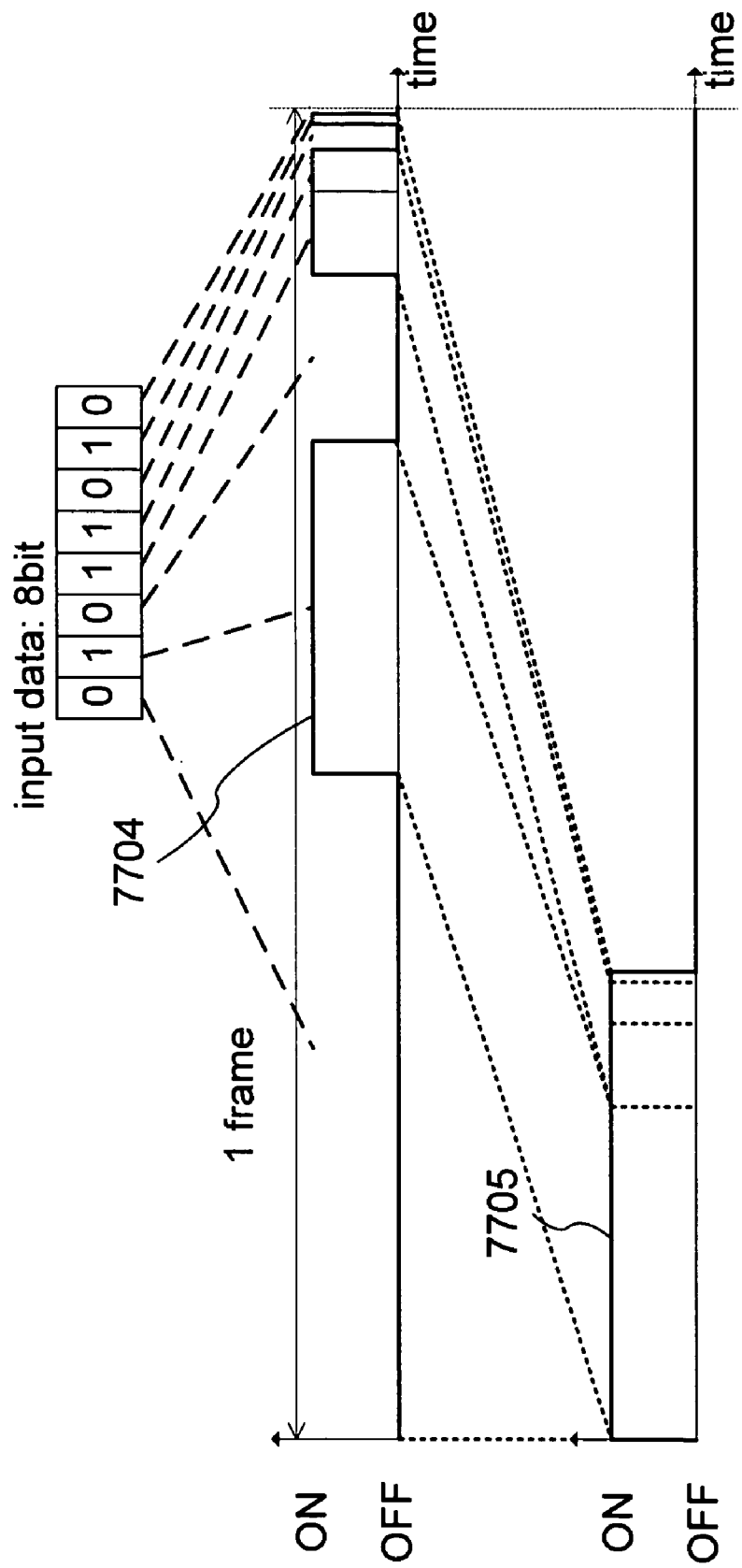
FIG. 13 is a chart illustrating a conversion from binary data to non-binary data performed in a projection apparatus according to the embodiment of the present invention.
Figure 14:
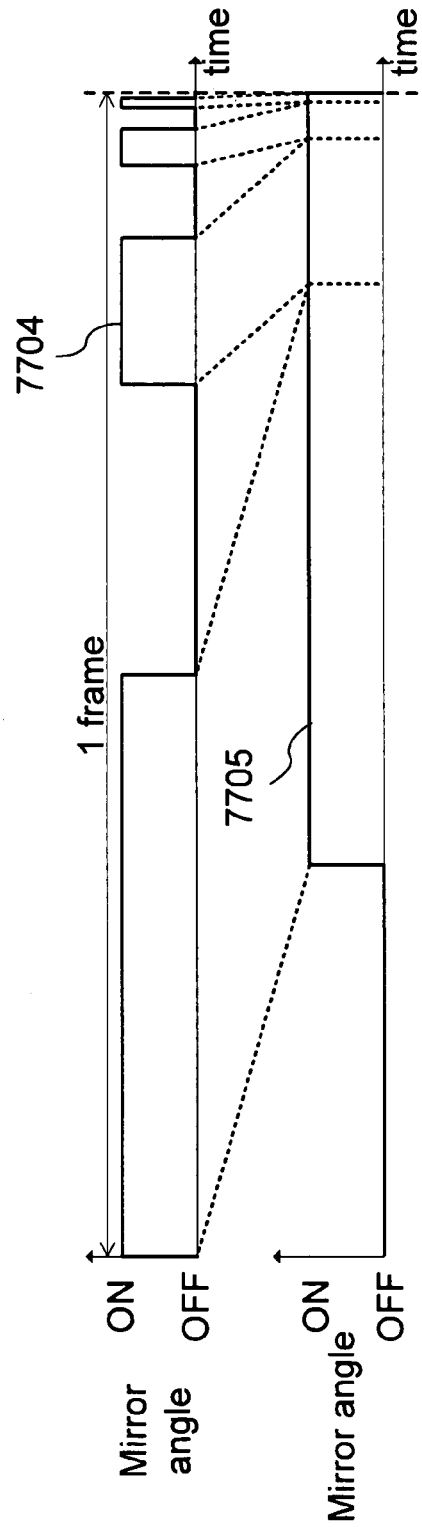
FIG. 14 is a chart for showing a conversion from binary data to non-binary data performed in a projection apparatus according to the embodiment of the present invention.

As shown in FIG. 13, an 8-bit "01011010" binary data 7704 is converted into non-binary data 7705, which is a forward-packed bit string. FIG. 14 illustrates a data string structure that converts the binary data 7704 shown in FIG. 12, as described above, into a bit string of non-binary data 7705 with the digits packed backward. In this case, the mirror 5112 is turned ON only in the period of time corresponding to the bit string number starting from the middle of a frame display period to the end.

Figure 15:
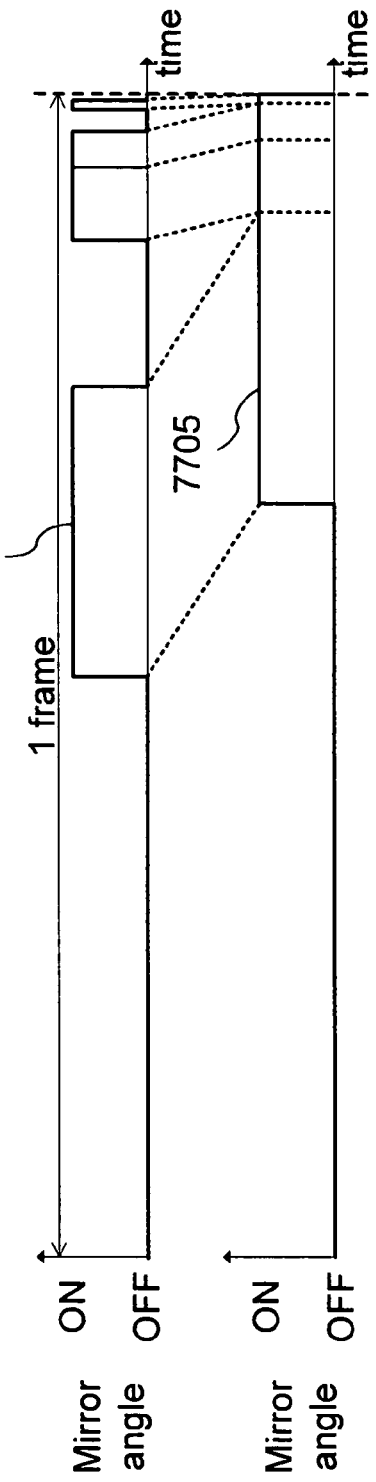
FIG. 15 is a chart for illustrating a conversion from binary data to non-binary data performed in a projection apparatus according to the embodiment of the present invention.

Likewise, FIG. 15 illustrates another data string structure that converts the binary data 7704 shown in FIG. 13, as described above, into a bit string of non-binary data 7705 with the digits packed backward, and controls the ON/OFF of the mirror 5112. When the ON/OFF is controlled by the non-binary data 7705, as described above, the ON period of the mirror 5112 becomes continuous, therefore controlling the emission intensity of the variable light source 5210 synchronously with the ON period becomes easy.

Figure 16:
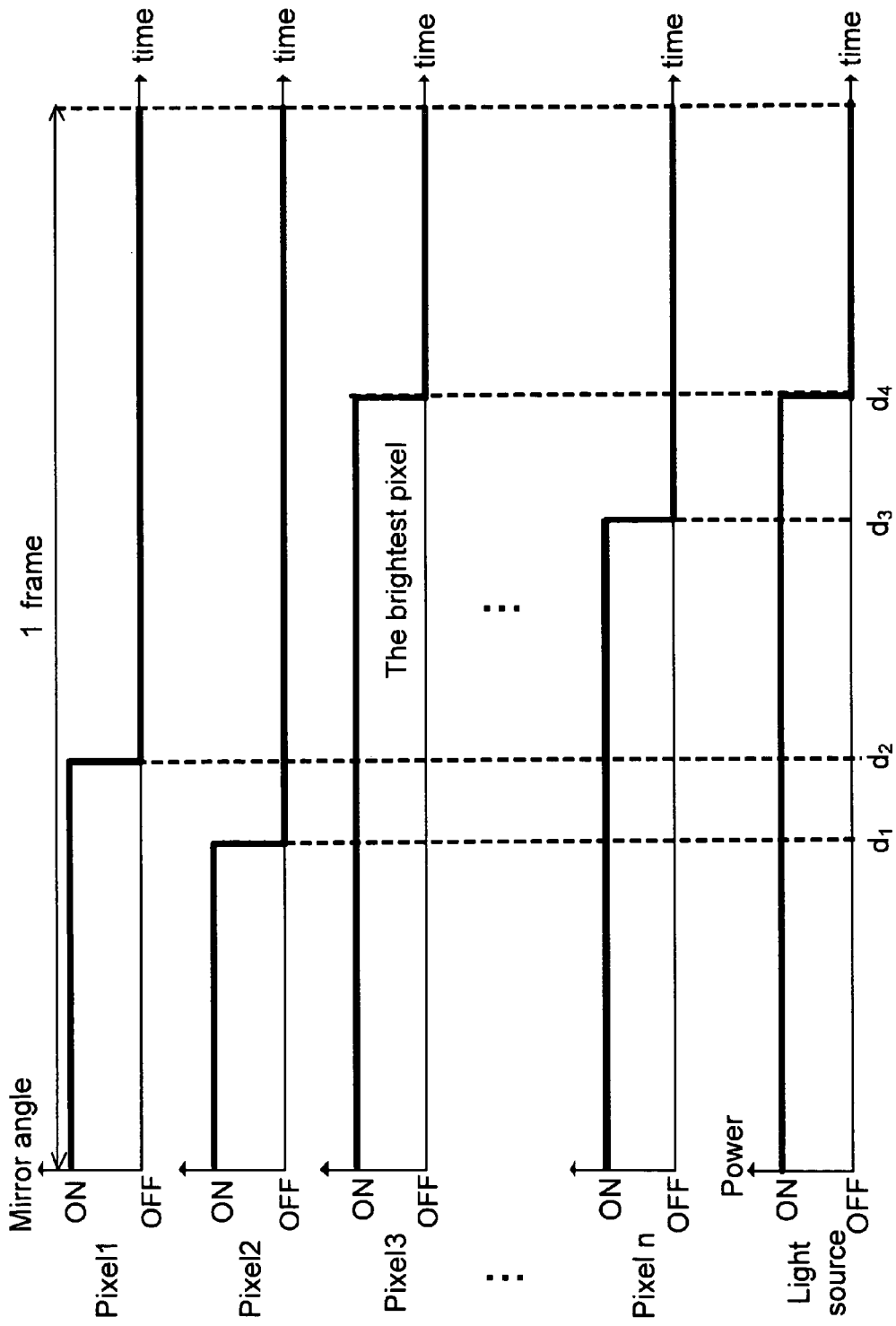
FIG. 16 is a graph illustrating a synchronism between the deflection angle of an individual mirror and the light source in the embodiment of the present invention.

Within the time period each mirror producing maximum brightness reflects the incident light to the ON position, the other mirrors finish the ON operation. Beyond the time period, the mirror producing maximum brightness performs the ON operation, turning the light source off within one frame or sub-frame. It is assumed that each mirror element is under a PWM control that uses non-binary data. FIG. 16 is a graph showing the synchronization between a light source and the deflection angle of each mirror element.

In FIG. 16, the vertical axis indicates the deflection angle of a mirror, defined as "ON" or "OFF" based on the incident light, and the output of a light source. The output of the light source is defined as "ON" when the light source outputs the incident light that projects an image and "OFF" when the power supply of the light source is completely shut off. Furthermore, the horizontal axes indicate the elapsed time. It is assumed that there are n-pieces of individual mirror elements, which are represented by Pixels 1 through n. Moreover, the Pixel 3 is assumed to be a mirror element with maximum brightness (i.e., the brightest pixel), producing the maximum intensity of reflection light (i.e., the intensity of the ON light state) to the projection light path.

Referring to FIG. 16, the brightest pixel 3 is in an ON state until time $d_4$. All the other mirror elements end the ON state by time $d_4$. Until time $d_4$, the brightest pixel 3 remains in an ON state, the ON state of the pixel 2 ends at time $d_1$, the ON state of the pixel 1 ends at time $d_2$, and the ON state of the pixel n ends at time $d_3$. At time $d_4$, the output of the light source and the deflection angle of the mirror or pixel 3 are synchronously turned OFF. This series of operation concludes one frame. Such a control can also be carried out for a sub-frame.

As described above, the light source is synchronized with a mirror element of maximum brightness, and when the mirror element with the maximum brightness reflects incident light to the ON state, the other mirror elements stop reflecting their incident light to the ON state. Outside such a time, the light source is turned off. As a result, during the transition operation of mirror elements, unstable reflection of the incident light can be eliminated, producing a clear image. This is not the case for a mirror element with the maximum brightness within one frame or sub-frame period.

Particularly, it is preferable to turn on the light source when each mirror stops and is ready to continue the ON state, and to turn off the light source immediately before a mirror element that is the last to be projected enters an OFF state for reflecting incident light.

Furthermore, the present control scheme causes each mirror element to operate in an ON position for one frame or sub-frame by way of a pulse width modulation (PWM) control, and to reflect the incident light to the OFF position, in the midst of the ON position of each mirror element.

During the period the mirror element with the maximum brightness (noted as "the brightest mirror element") reflects the incident light to the ON position, the other mirror elements finish reflecting the incident light to the ON position, and furthermore, each mirror element deflects to the OFF state to reflect the incident light during the ON state of each mirror element. Here, it is assumed that each mirror element is under a PWM control using non-binary data.

Figure 17:
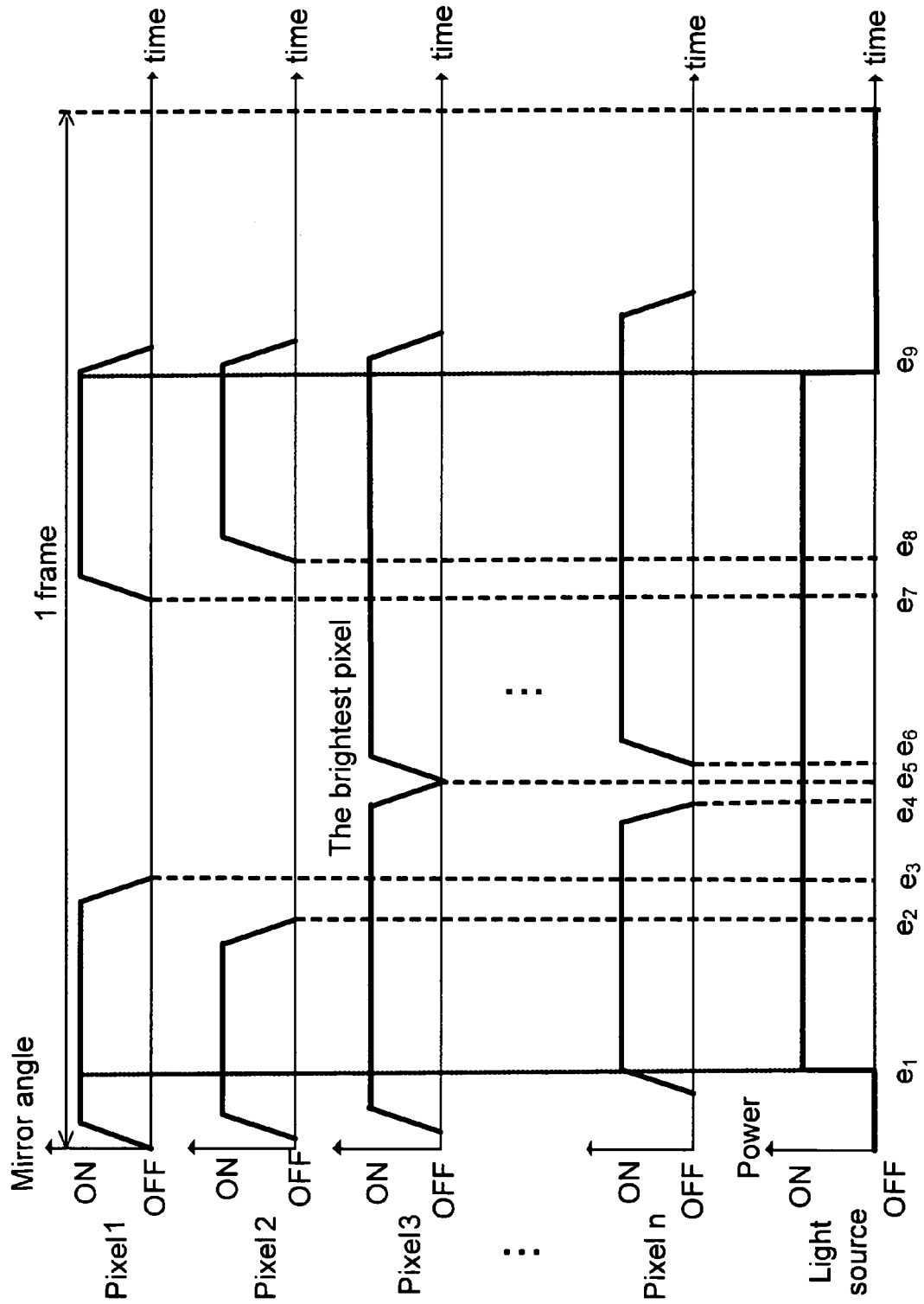
FIG. 17 is a graph illustrating an individual mirror element performing one OFF operation within one frame while synchronizing a light source and the individual mirror element in the embodiment of the present invention.

FIG. 17 is a timing diagram that shows each mirror element within one frame carrying out an OFF state while synchronizing a light source, according to the present embodiment. In FIG. 17, the vertical axis indicates the deflection angle of a mirror and the output of a light source, with the deflection angle defined as "ON" when the incident light comprises an ON light, and that of the mirror defined as "OFF" when the incident light comprises an OFF light. The output of the light source is defined as "ON" when the light source outputs the incident light that projects an image, and "OFF" when the power supply to the light source is completely shut off. Furthermore, the respective horizontal axes indicate the elapsed time. It is assumed that there are n-pieces of individual mirror elements, each represented by Pixels 1 through n. The figure delineates the control for each mirror element within one frame. Other assumptions are that the output of the light source is turned ON between the time $e_1$ and $e_9$; and Pixel 3 is the mirror element that produces the maximum intensity of reflection light (i.e., the intensity of ON light state) toward a projection light path.

At time $e_5$: the brightest Pixel 3 is in an OFF state. The other pixels cannot turn ON while the brightest Pixel 3 is in an OFF state at the time $e_5$. While the mirror element with the maximum brightness is in an OFF state, the other mirror elements cannot be in an ON state. So all mirror elements are in the OFF state, resulting in a black image.

Between the time $e_1$ and time $e_5$ which is the period when the brightest Pixel 3 is in the ON position, Pixel 2 is in an OFF position at the time $e_2$, Pixel 1 is in the OFF state at the time $e_3$, and the Pixel n is in the OFF state at time $e_4$. Then, at time $e_5$, the brightest Pixel 3 is in the ON state immediately after being in the OFF state. Then, after the brightest Pixel 3 is in the ON position, the other elements respectively follow.

Therefore, Pixel n is in the ON state at time $e_6$.; Pixel 1 at time $e_7$, and Pixel 2 at time $e_8$.. Then, at time $e_9$: the output of the light source is turned OFF, finishing one frame. Note that this control scheme can also be carried out for sub-frames.

Meanwhile, in FIG. 17, the output of the light source is turned ON in the midst of the OFF state of the mirror element with the maximum brightness. However, it is also possible to turn ON/OFF the output of the light source synchronously with the OFF or ON state of the mirror element with the maximum brightness. Further, it may also be possible to synchronize the start and finish of the ON and OFF states of other mirror elements with that of the mirror element with the maximum brightness.

As described above, all mirror elements move to the OFF position from the ON position of the individual mirror elements within the period of one frame or sub-frame. As a result, the light and shade are enhanced by inserting a black image between individual frames or sub-frames to improve image quality. Meanwhile, turning off the light source makes it possible to reduce the power consumption and heating of the spatial light modulator. The mirror device comprising such controlled mirror elements can also be used for a projection apparatus. For example, a single-panel projection apparatus, which is described above in FIGS. 3 and 4 comprise one or a plurality of mirror devices, respectively.

Embodiment 3

According to the present embodiment, a mirror device is configured to arrange a plurality of mirror elements as array of mirror elements each comprising both a deflectable mirror, supported by an elastic hinge formed on a substrate which reflects the incident light emitted from a light source. A single address electrode is asymmetrical formed between the left and right sides, about the deflection axis of the mirror placed on the substrate. Furthermore, the light source is turned off during the period in which the mirror performs a series of operations starting from the mirror's initial state to the completion of the mirror deflection of one side of the single address electrode after deflecting to the other side. The light source may be implemented as a single semiconductor light source such as a laser light source.

The following three spatial light modulators 5100 is a description of one mirror element that comprises a mirror device according to the present embodiment.

FIGS. 18A, 18B, 18C and 18D are cross-sectional diagrams of the mirror element 8600 according to the present embodiment, and respectively show the initial state, ON state, OFF state and oscillation state of mirror 8602. FIG. 18E is a conceptual diagram showing the configuration of one mirror element 8600 according to the present embodiment.

The mirror element 8600 according to the present embodiment illustrated in FIGS. 18A through 18D include one drive circuit as shown in FIG. 18E. The mirror element 8600 according to the present embodiment shown in FIG. 18A includes, on the substrate 8607, one drive circuit used for deflecting the mirror 8602 shown in FIG. 18E. Furthermore, an insulation layer 8608 is on the substrate 8607, and one elastic hinge 8604 is formed on the insulation layer 8608. One elastic hinge 8604 supports one mirror 8602, and a singular address electrode 8603, connected to one drive circuit, is formed under one mirror 8602. One mirror 8602 in this configuration is electrically controlled by a single address electrode and connected to one drive circuit. Moreover, a hinge electrode 8606 connected to the elastic hinge 8604 is grounded by penetrating the insulation layer 8608.

The drive circuit shown in FIG. 18E requires only one electrode to apply a voltage, making it possible to eliminate the two memory cells that correspond to two address electrodes 5116 and 5116 (refer to FIG. 11), leaving only the memory cell 4014. This configuration enables a reduction in the number of wirings required to control the deflection of the mirror 8602. Incidentally, other exemplary embodiments are the same as those described for FIG. 11, therefore their descriptions are not provided here.

One mirror element 8600 is configured according to the present embodiment as described above. Furthermore, the mirror device is comprised by placing a plurality of the above described mirror elements 8600 on the substrate 8607.

The single address electrode 8603 of mirror element 8600 as describe is exposed above the substrate 8607 shown as the "first electrode part" for the right one and as the "second electrode part" for the left one, with the deflection axis of the elastic hinge 8604 or mirror 8602 acting as the border. The design is such that a Coulomb force is generated either between the mirror 8602 and the first electrode part or between the mirror 8602 and second electrode part by applying a voltage to the single address electrode 8603. The phrase "applying a voltage," noted in the present specification document can be rephrased to "changing an electric potential according to a predetermined waveform".

Note that the Coulomb force F generated between the mirror 8602 and the first electrode part or between the mirror 8602 and second electrode part is represented by the following expression (1):

$$F = \frac{1}{4\pi r^2} \cdot \frac{1}{\varepsilon} q_1 q_2; \quad (1)$$

where "r" is the distance between the mirror 8602 and the first electrode part or the distance between the mirror 8602 and second electrode part, "∈" is permittivity, "q1" and "q2" are the amount of charge retained by the first electrode part (or the second electrode part) and the mirror 8602.

Determining the Coulomb force F between the left and right sides of the mirror 8602 with different forces deflect the mirror 8602 to the left or right of the deflection axis. It is preferable for the angle formed between the vertical axis of the substrate 8607 and the deflection angle of mirror, to be symmetrical (between the left and right sides), when the mirror 8602 is deflected to the left or right side of the deflection axis.

The mirror 8602 is formed with a surface of either a high reflectance metallic material or a dielectric multi-layer film. Furthermore, the entire hinge or a part (e.g., the base part, neck part or middle part) of the elastic hinge 8604 supporting the mirror 8602 is comprised of a metallic material, possessing a restoration force.

Note that the present specification document depicts the elastic hinge 8604 as a cantilever possessing elasticity in a degree that allows a free oscillation of the mirror 8602. The elastic hinge 8604 can also be formed as a torsion hinge. The single address electrode 8603 is made of a conductive material such as aluminum (Al), copper (Cu), or tungsten (W), and is configured to have the same potential throughout the whole electrode. Furthermore, the insulation layer can use, for example, $SiO_2$ or SiC, while substrate 8607 can use Si.

Note that the material and form of each constituent component of the mirror device 8600 put forth in the present specification document may be appropriately changed according to its purpose. In the following FIGS. 18B through 18D, the single address electrode 8603 and the like are described as asymmetrical about the elastic hinge or the deflection axis of the mirror. Another assumption is that the first electrode part of the single address electrode 8603 is the OFF light side and the second electrode part is the ON light side.

Figure 18A:
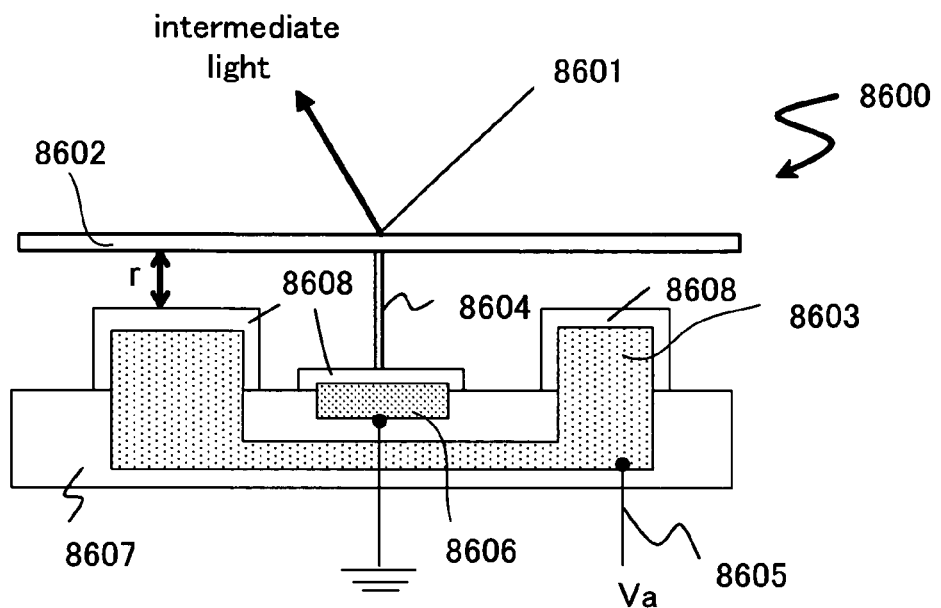
FIG. 18A shows the configuration, in the initial state, of one mirror element according to a preferred embodiment of the present invention.
Figure 18B:
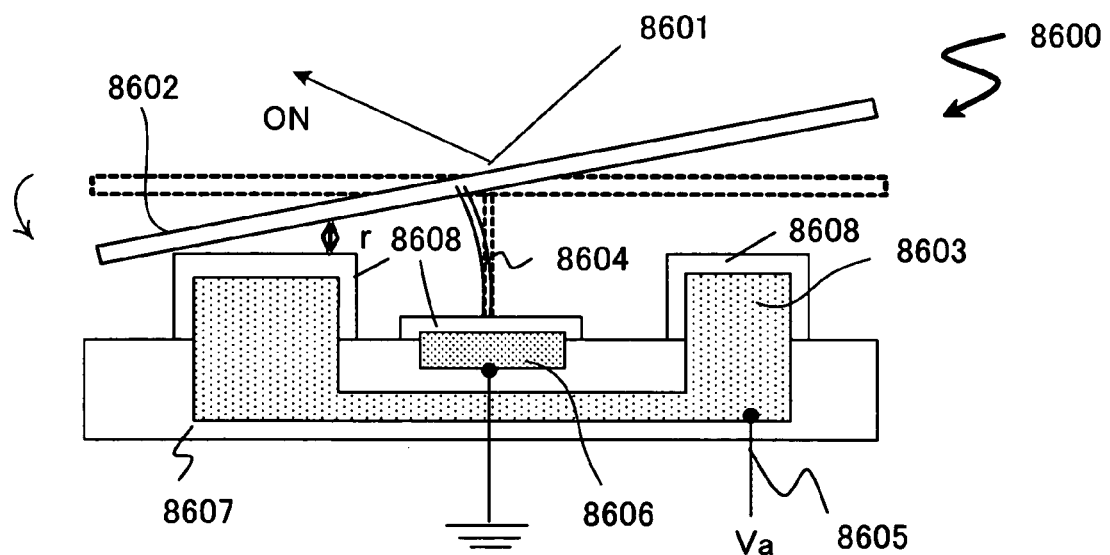
FIG. 18B shows the configuration, in an ON state, of one mirror element according to a preferred embodiment of the present invention.

As indicated by the cross-sectional diagram of one mirror element shown in FIG. 18A, the initial state of the mirror device according to the present embodiment is that the mirror is horizontal to the substrate. For example, in the following description for FIG. 18A, the initial state of the mirror reflects the incident light 8601 along a direction that is applied in an image projection system as an intermediate light. FIG. 18B shows a cross-sectional diagram of a mirror element 8600 operates in an ON light state of the mirror device, according to the present embodiment. Referring to FIG. 18B, a voltage is applied to the single address electrode 8603 in the initial state shown in FIG. 18A to generate a Coulomb force F between the first electrode part (and the second electrode part) and a mirror 8602. By forming the second electrode part with a larger area than that of the first electrode part, the Coulomb force generated between the second electrode part and the opposite mirror 8602 is larger than the Coulomb force generated between the first electrode part and opposite mirror 8602. The mirror is accordingly tilted to the second electrode part. The application of a voltage to the single address electrode 8603 deflects the mirror 8602, thereby making it possible to project the incident light 8601 as an ON light.

Figure 18C:
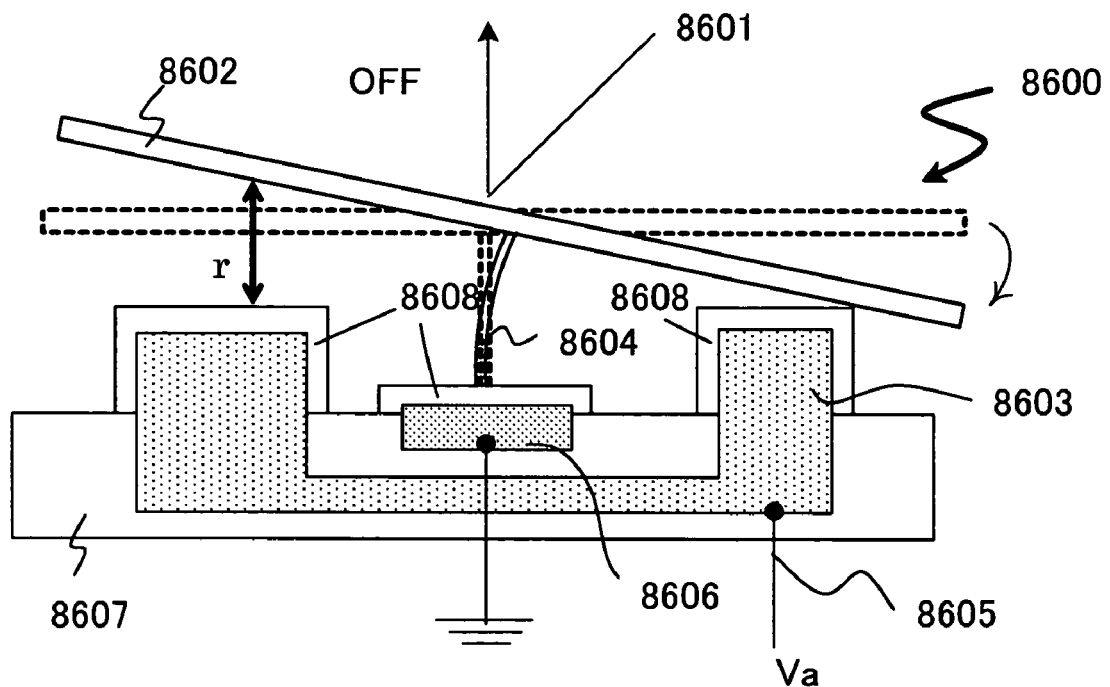
FIG. 18C shows the configuration, in an OFF state, of one mirror element according to a preferred embodiment of the present invention.

FIG. 18C shows a cross-sectional diagram of a mirror element 8600 operates in an OFF light state of the mirror device, according to the present embodiment. As shown in FIG. 18B, the voltage applied to the single address electrode 8603 to control the mirror to operate in an ON state is turned off. The elastic force of the mirror hinge 8604 causes the mirror 8602 to oscillate along an opposite direction. With this free oscillation, the mirror 8602 alternates between the deflection angle producing the ON light and that producing the OFF light. When the distance r between the free-oscillating mirror 8602 and a part of the single address electrode 8603 producing the OFF light is short, a voltage is re-applied to the single address electrode 8603 at the appropriate time. This regenerates a Coulomb force F between the first electrode part and the opposite mirror, and between the second electrode part and the opposite mirror, respectively. Now, if the distance between the first electrode part and mirror is short and that between the second electrode part and mirror is long, the coulomb force of the first electrode part is larger than that of the second electrode part because coulomb force decreases proportionately to the second power of the distance. Therefore, the mirror attracted to the first electrode part contacts the single address electrode 8603, thereby the mirror 8602 produces the OFF light.

Then, when the mirror 8602 is horizontal to the substrate, as in the initial state, an appropriate pulse voltage is applied to the single address electrode 8603 at the position of the free-oscillating mirror 8602, causing it to stand still. To return to the initial state in the conventional technique, appropriate voltages are applied to two single address electrodes 8603, generating similar coulomb forces that cause a mirror to stand still. In contrast, the present invention applies a pulse voltage to the single address electrode 8603, making it possible to return the mirror 8602 to the initial state. As described above, it is possible to control the ON and OFF light of the incident light by inputting a voltage to the single address electrode 8603. Therefore, each mirror can be independently controlled by a smaller number of the address electrodes than in the conventional method. Furthermore, a configuration with only one address electrode makes it possible to reduce the number of drive circuits connected to the address electrode to one.

Unlike with the conventional technique, this configuration makes it possible to further reduce the size of the mirror device.

Figure 18D:
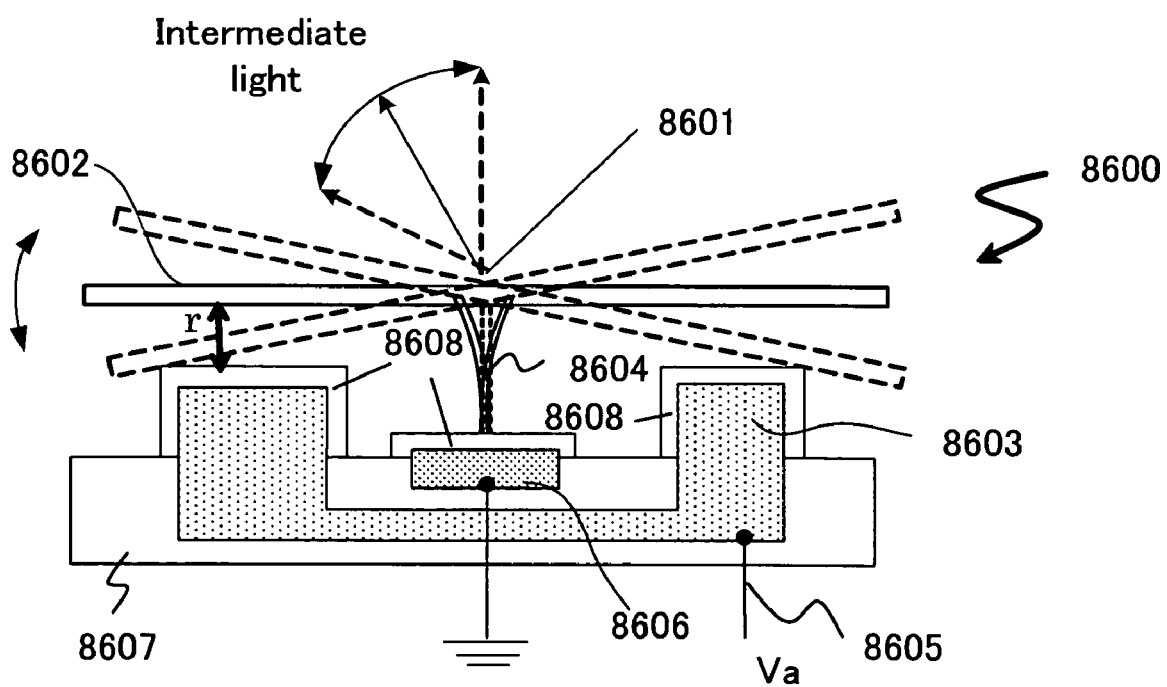
FIG. 18D shows the configuration, in a free oscillation state, of one mirror element according to a preferred embodiment of the present invention.
Figure 18E:
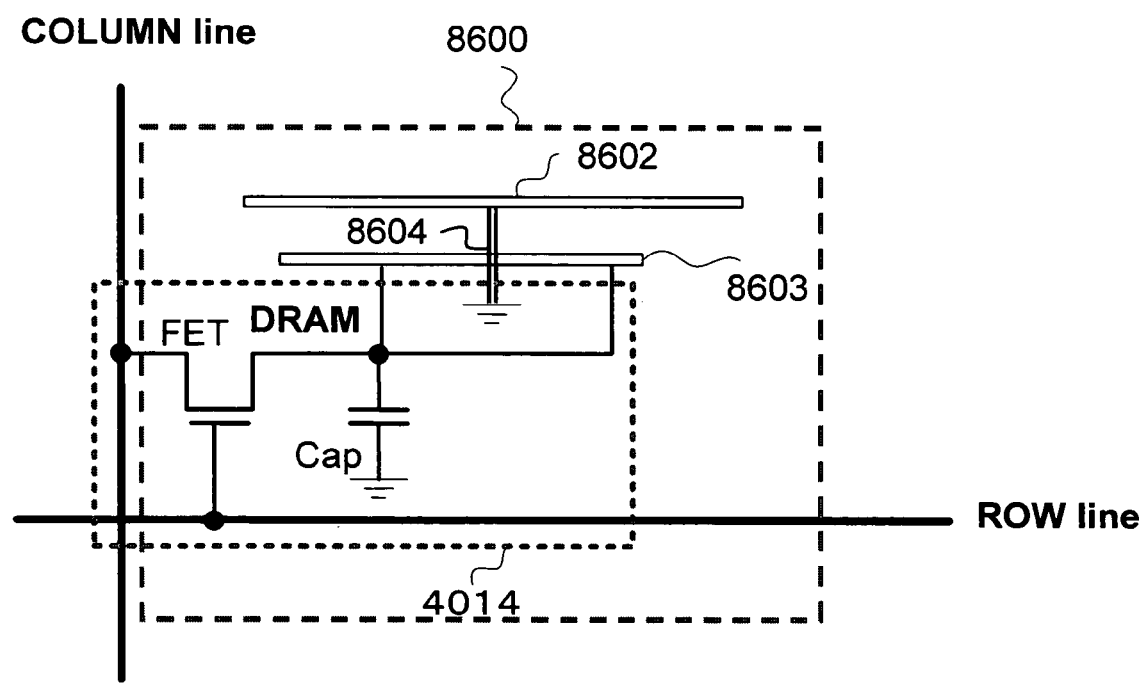
FIG. 18E is a block diagram showing an exemplary configuration of one mirror element according to a preferred embodiment of the present invention.

As shown in FIG. 18D the free oscillation of a mirror between the deflection angle of the mirror producing the ON light and that of the mirror producing the OFF light, and the definition of the intensity of an intermediate light, controls the intensity of reflection to projection path. FIG. 18D shows that the free oscillation of mirror 8602 causes the continuous repetition of the ON light state, intermediate light state and OFF light state. Furthermore, controlling the number of repetitions and the like controls the intensity of the incident light reflected to a projection light path. Therefore, accumulation of the incident amount of light ("light volume" hereinafter), which are each reflected toward the projection light path per cycle, makes it possible to control an amount of the intermediate light between the complete ON state and that in the complete OFF state. The single address electrode controls the intensity of light reflected by one mirror under at least three states, i.e., the ON light, intermediate light and OFF light. Therefore, the intensity of light reflecting the projection light path can be adjusted appropriately. Furthermore, it is also possible to change the respective heights of the first electrode part and second electrode part of the single address electrode shown in FIGS. 18A through 18D. It is also possible to add a stopper or implement other similar configurations.

In FIGS. 18A through 18D, the initial state of the mirror, the state of the mirror that is retained on the first electrode part and the state retained on the second electrode part may be assigned to an ON light state, OFF light state and intermediate state. Adjustment to the restoring force of the elastic hinge according to different operational requirements can also adjust the operation of the free oscillation. Incidentally, the single address electrode may have asymmetrical elastic properties relative to the deflection axis of the mirror.

Figure 19:
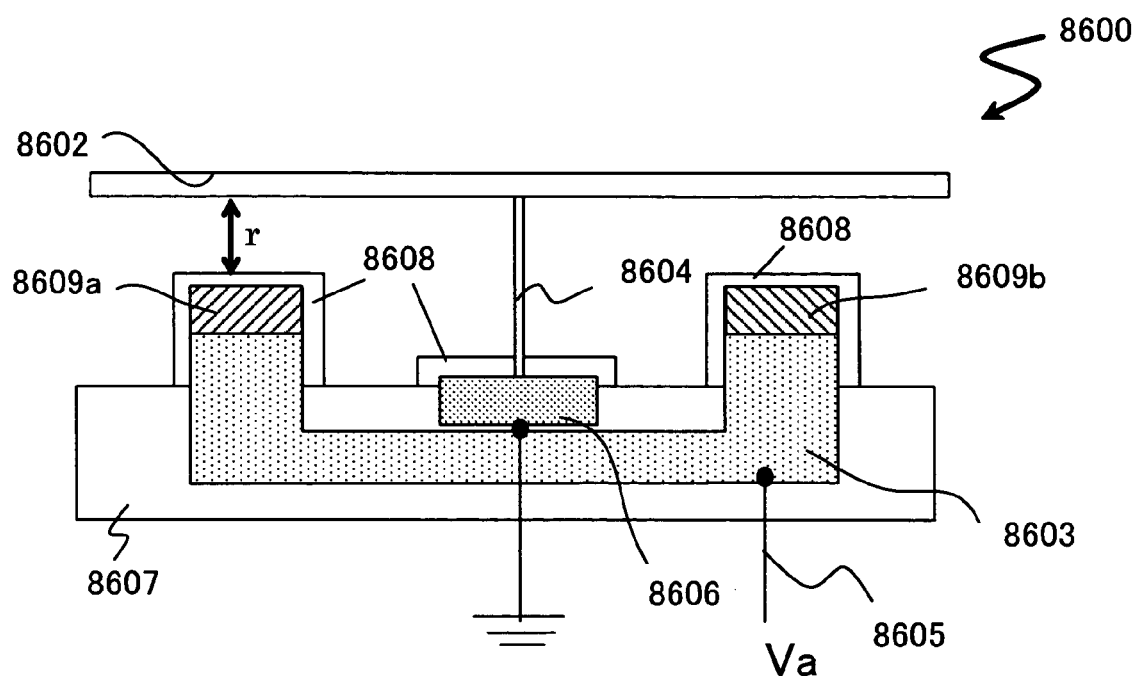
FIG. 19 is a diagram showing the configuration using a material with different permittivity on the upper parts of the first electrode part and second electrode part of a single address electrode of one mirror element according the embodiment of the present invention.

FIG. 19 is a cross-sectional diagram showing an exemplary modification of the mirror element 8600 according to the present embodiment. The mirror element 8600 in FIG. 19 uses materials with different permittivity values on the upper parts between the first and second electrode parts of the single address electrode 8603. Such a configuration makes it possible to control the mirror 8602 under the ON or OFF light states even if the single address electrode 8603 is formed symmetrically. As FIG. 19 shows, the mirror element 8600 is formed symmetrically about the elastic hinge 8604 when materials with different permittivity values are used. Note that the form of the single address electrode 8603 may be modified appropriately. In the case of a mirror produced by base materials Si or $SiO_2$, it is preferable to have high-k materials with different and high permittivity values, which include $Si_3N_4$ and $HfO_2$, and are compatible with the process of reducing the size of a single semiconductor. In another method, materials with different permittivity values can be used for the first and second electrode parts of the upper part of the single address electrode 8603 to control mirror 8602 under the ON and OFF light state.

The following is a brief description of a control method for a mirror element shown in FIG. 19. When mirror 8602 is deflected from the initial state, applying a voltage to the single address electrode 8603 makes it possible to tilt the mirror 8602 to one side with low permittivity based on the expression (1). The reason is that one side of the single address electrode 8603 has a smaller permittivity $\in$ in terms of the expression (1 than the other side, which has a larger permittivity value, and therefore a stronger coulomb force to the mirror 8602 in the initial state. The mirror 8602, tilted from the initial state, is changed to a free oscillation state by temporarily changing the voltage of the single address electrode 8603 to "0" volts. An appropriate voltage is applied to the single address electrode 8603 when the freely oscillating mirror 8602 gets close to it on the ON or OFF light side. As a result, the ON or OFF light state controls mirror 8602 when it is in the first or second electrode side. This is because the distance r between the mirror 8602 and single address electrode 8603 has a larger influence on the Coulomb force F than the permittivity $\in$ does. Therefore, applying a voltage to the single address electrode 8603 when the distance r has a larger influence makes it possible to tilt the mirror 8602 to the ON or OFF light side.

The above-described operation the mirror 8602 is controlled to operate from the initial state to the OFF or ON light state. Furthermore, the method for controlling the mirror 8602 from the ON or OFF light state to the initial state is similar to that of the mirror element shown in FIGS. 18A through 18D. It is possible to return the mirror 8602 to the initial state from the ON or OFF light state by applying an appropriate pulse voltage. For example, the mirror 8602 performs a free oscillation by reducing the voltage applied to a corresponding single address electrode 8603 to "0". Then, when there is an appropriate distance r between the single address electrode 8603 and mirror 8602, a voltage is temporarily applied to the single address electrode 8603, while the mirror 8602, which performs a free oscillation, moves to a new side. As a result, a coulomb force F pulls the free-oscillating mirror 8602 to a different side from the side it had been headed towards. Accelerating toward a different direction makes it possible to return the mirror 8602 from to the initial state. Therefore, applying a pulse voltage to the single address electrode 8603 shifts the mirror from the ON or OFF light state to the initial state.

It is preferable that the non-binary data obtained by converting binary data controls mirror 8602, as shown in the conversion methods described in FIGS. 12, 13, 14 and 15. Note that the PWM uses non-binary data to control mirror 8602 in the present embodiment.

As described above, in the case of the single address electrode 8603 that controls the mirror 8602, a "dummy operation" is required to tilt the mirror 8602 from the initial state to a side in which the coulomb force between the mirror 8602 and single address electrode 8603 is smaller or larger The present embodiment is configured to turn off the light source synchronously with the mirror device carrying out the dummy operation.

The following is a description of the operation for turning off the light source synchronously with the mirror device carrying out a dummy operation.

Figure 20:
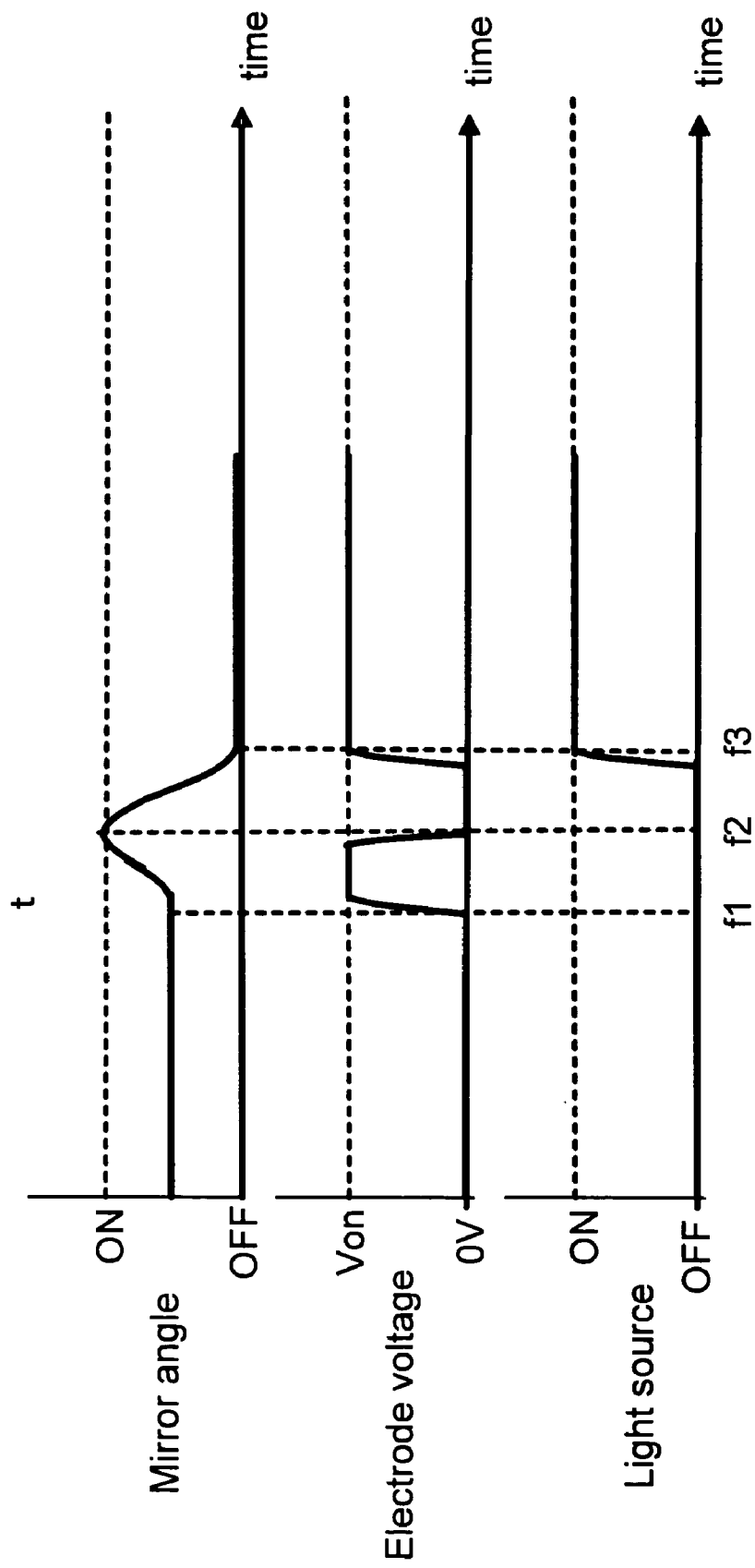
FIG. 20 is a graph illustrating that a light source is turned off in synchronous with a dummy operation of an individual mirror element according the embodiment of the present invention.

FIG. 20 is a timing diagram for illustrating the time sequence for turning off a light source synchronously with a dummy operation of each mirror element. In FIG. 20, the vertical axis shows the deflection angle of the mirror, which is defined as "ON" or "OFF" based on the constitution of the incident light, the voltage applied to an electrode and the output of a light source. Furthermore, a voltage is defined as "Von" when it is applied to a single address electrode and as "0 V" when it is not. Moreover, the output of a light source is defined as "ON" when outputting the image projected by the incident light, while it is defined as "OFF" when the power for the light source is completely shut off. The respective horizontal axes represent elapsed time. The graphs show that in the initial state, the deflection angle of a mirror on a side where the Coulomb force between the mirror and single address electrode is large is "ON", while the deflection angle of the mirror on the side where the Coulomb force between the mirror and single address electrode is small is "OFF".

The light source is completely shut off until time $f_1$: to maintain the voltage at "0", thereby keeping the deflection angle of mirror at its initial state.

The light source is OFF at time $f_1$:, and a voltage is applied to the single address electrode to make it Von. As a result, the mirror is deflected to the ON deflecting angle, where the Coulomb force between the mirror and single address electrode is large.

While the light source is OFF, the voltage is applied to the single address electrode until time $f_2$. Accordingly, the mirror is maintained at the ON deflection angle to abut the single address electrode.

While the light source is OFF, the application of the voltage to the single address electrode is stopped at "0" volts at time $f_2$:, resulting in a free oscillating mirror.

While the light source is OFF, the voltage to the single address electrode is at "0" volts until time $f_3$. As a result, the mirror continues to freely oscillate and shifts from the ON to the OFF deflection angle.

At time $f_3$: when the mirror approaches the OFF deflection angle, a voltage Von is applied to the single address electrode. As a result, the mirror abuts on the single address electrode to maintain the OFF deflection angle. As described above, the operation between the time $f_1$:, the initial state of the mirror, and the time $f_3$:, when the mirror is retained on the side with a smaller Coulomb force (in the initial state), is referred to as a "dummy operation". Then, following the completion of the dummy operation the deflection angle of the mirror is deflected to an OFF direction, the output of the light source is synchronously turned ON.

As described above, through the operation of causing the light source to synchronously turn off with the mirror device when it is performing a dummy operation, makes it possible to eliminate an unstable reflection of light, while the mirror is moving under a deflecting operation. A projection apparatus comprising such a mirror device is capable of eliminating an unstable reflection of light while the mirror is deflecting, thereby improving the image quality. Projection apparatuses comprising mirror devices are single and multi-panel, as described above in FIGS. 3 and 4, respectively.

Embodiment 4

The present embodiment is configured to array a plurality of mirror elements, which each comprises both an address electrode placed on a substrate under the mirror and a deflectable mirror, which is supported by an elastic hinge set on a substrate and which reflects the incident light emitted from a light source. Furthermore, the present embodiment is configured to retain the mirror, during a period of time the light source is turned off, in a deflecting direction that is the reverse of the direction in which the mirror is reflected at the end of a period when the light source is turned on. It is preferable that the time to reversely deflect the mirror is proportional to the time it takes to deflect the mirror at the end of the light source's turn-on period.

The mirror elements according to the present embodiment are, for example, configured as shown in FIGS. 10, 11, 18A, 18B, 18C, 18E and 19. The light source may be implemented as a single semiconductor light source such as a laser light source. Furthermore, it is preferable to control a mirror with non-binary data obtained by converting binary data, as described in FIGS. 12, 13, 14 and 15.

The following describes the reverse deflection of the mirror when the light source is turned off. When the light source is turned off, the time it takes to retain the mirror in reverse is proportional to the time it takes to deflect the mirror at the end of the turn-on period of the light source. It is assumed that each mirror is controlled by PWM using non-binary data.

Figure 21:
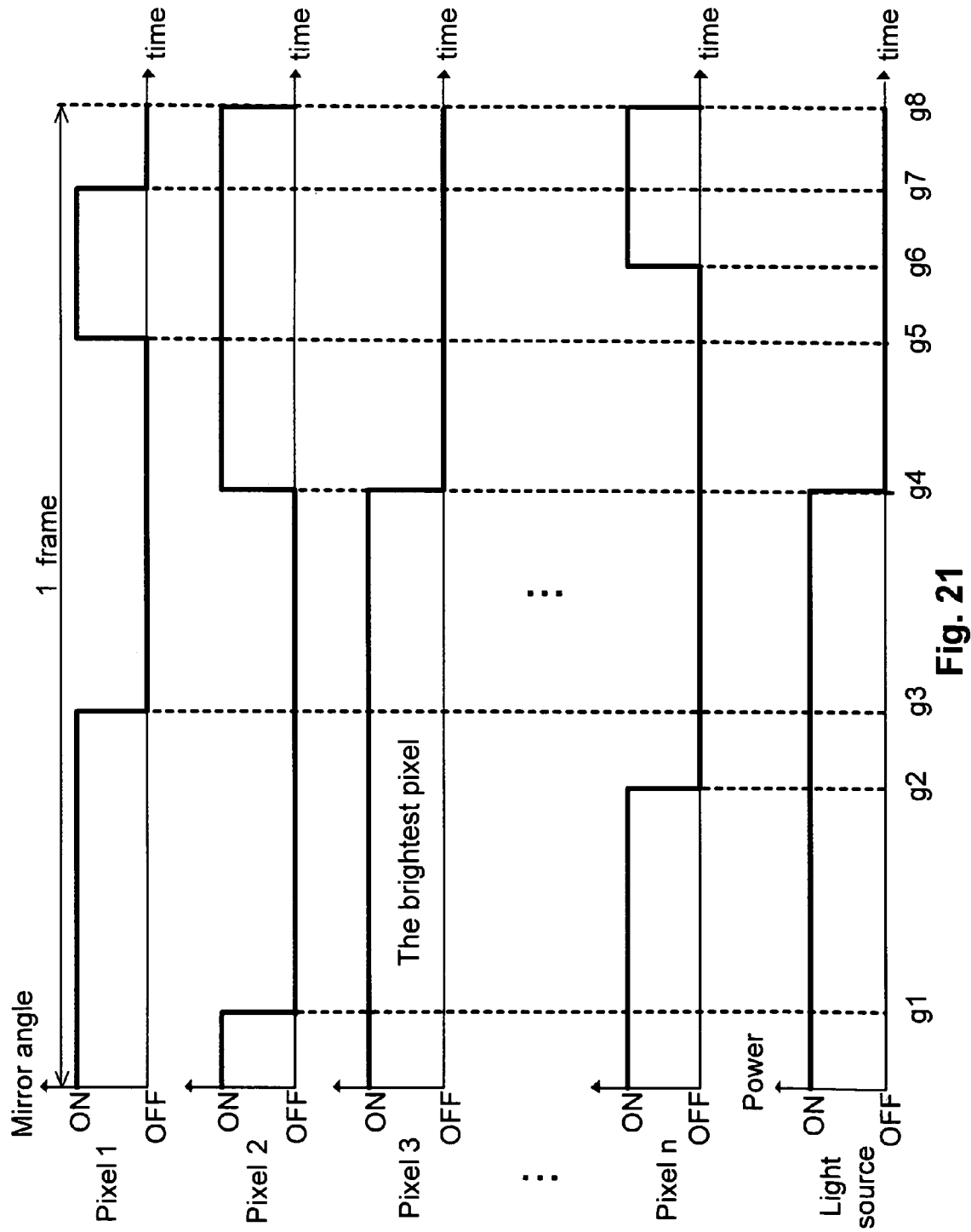
FIG. 21 is a graph illustrating a synchronism between the deflection angle of an individual mirror element and a light source according to the embodiment of the present invention.

FIG. 21 is a timing diagram for illustrating the synchronization of the light source and the deflection angle of each mirror element. The vertical axis in FIG. 21 indicates the deflection angle of a mirror and the output of a light source, with the deflection angle of the mirror defined as "ON" or OFF based on the constitution of the incident light. Furthermore, the output of the light source is defined as "ON" when it can output an incident light to project an image, and "OFF" when the power supply of the light source is completely shut off. Moreover, the respective horizontal axes represent the elapsed time. The assumption is that there are n-pieces of individual mirror elements, with the individual mirror elements represented by Pixels 1 through n. The figure delineates the control of each mirror element within one frame. Furthermore, Pixel 3 is assumed to be a mirror element with maximum brightness (i.e., the brightest pixel), which is the mirror element that produces the maximum intensity of reflection light to a projection light path and that remains ON for the longest period of time. Furthermore, the period in which Pixel 3 produces the maximum brightness is ON and is synchronized with the period in which the light source is ON. Then, at the time $g_4$ the brightest Pixel 3 and the light source are both turned from ON to OFF. All mirrors are ON, and the light source and Pixel 3 are synchronously ON until time $g_1$:.

Between time $g_1$: and time $g_4$:, the time length the brightest Period 3 is ON, the Pixel 2 turns OFF at time $g_1$:, the Pixel n turns OFF time $g_2$, and Pixel 1 turns OFF at time $g_3$:, while the light remains ON. At time $g_4$: the brightest Pixel 3 turns OFF and synchronously with Pixel 3, the light source is turned OFF. Then, each mirror is retained at the opposite direction from the direction it was deflected when the light source was turned off for a time period that is proportional to the time period the mirror was deflected Here, the length of time the mirror takes to deflect when the light source is off, is the longest for the Pixel 3, then Pixels 2, n and 1. Therefore Pixel 3 continues to be deflected to OFF between the time $g_4$: and $g_9$:. Then, Pixel 2 turns ON and keeps the mirror deflection angle ON between the time $g_4$: and time $g_8$:. Then, the Pixel n, turns ON and keeps the mirror deflection ON between the time $g_6$: and $g_8$:. Then, the Pixel 1, turns ON and keeps the mirror deflection angle along an ON direction between the time $g_5$: and $g_7$:.

As described above, a mirror is retained at the opposite direction from the direction it was deflected when the light source is turned off. Furthermore, length of time it takes to keep the mirror in the reverse direction when the light source is turned off is proportional to the length of time it takes the mirror to deflect it at the end of the turn-on period of the light source. Note that retaining the mirror in the inverse direction during the turn-off period of the light source is based on data that is different from the non-binary data that controls the mirror during the turn-on. In the following description, the "first control data" controls the mirror during a turn-on period of the light source, while the "second control data" controls the mirror during the turn-off period. Incidentally, the first control data corresponds to the data input to the bit line 5121-1 and bit line 5121-2, which are illustrated in FIGS. 11 and 18E.

The second control data has an inverse polarity opposite to that of the first control data immediately before the light source is turned off. Therefore, the second control data is obtained, for example in the following procedure. First, the first control data received immediately before the light source is turned off is stored. In this event, it is preferable to also store the time of each mirror's last deflection referred to as the "final deflection time"). Then, the operation stands by until the light source is turned off.

To obtain the second control data, the polarity of the first control is inverted when the turn-off of the light source is complete. With the second control data, the mirror is deflected to a direction that is different from the deflecting direction of the first control data at the end of the turn-on period of the light source. Note that it is preferable that the control for inverting the polarity of the bit line is carried out in the units of word line. Meanwhile, the second control data may be temporarily retracted from the bit line by storing it in frame memory or by the like operation. This operation makes it possible to control the time to retain a mirror in the reverse deflecting direction in accordance with the final deflection time stored immediately before the turn-off of the light source.

The control operations as that shown in FIG. 21 can also be carried out for a sub-field. Note that, in the present embodiment, a sub-frame is defined as data assigned to each different colors of light projected at different wavelengths when a projection apparatus projects a plurality of incident lights with different wavelengths in sequence.

Therefore, tilting a mirror opposite the direction of deflection during the period the light source is turned off prevents the elastic hinge of the mirror from deforming. As a result, the life of the mirror device is extended. Furthermore, such a mirror device can also be used for a projection apparatus. As described in FIGS. 3 and 4, respectively, single and multi-panel projection apparatuses comprise mirror devices.

Embodiment 5

A mirror device according to the present embodiment is configured to array a plurality of mirror elements each comprising both an address electrode placed on a substrate under the mirror and a deflectable mirror, which is supported by an elastic hinge set on a substrate and which reflects the incident light emitted from a light source. Furthermore, the present embodiment is configured so as to not apply voltage to the address electrode during the period in which the light source is turned off. The mirror elements according to the present embodiment are, for example, configured as illustrated in FIGS. 10, 11, 18A, 18B, 18C, 18E and 19. The light source may be implemented as a single semiconductor light source such as a laser light source.

Furthermore, it is preferable to control a mirror by using non-binary data obtained from the conversion of the binary data as shown in FIGS. 12, 13, 14 and 15.

The following is a description of the control process by not applying voltage to the address electrode during the period in which the light source is turned off. The assumption is that PWM controls each mirror element using the non-binary data.

Figure 22:
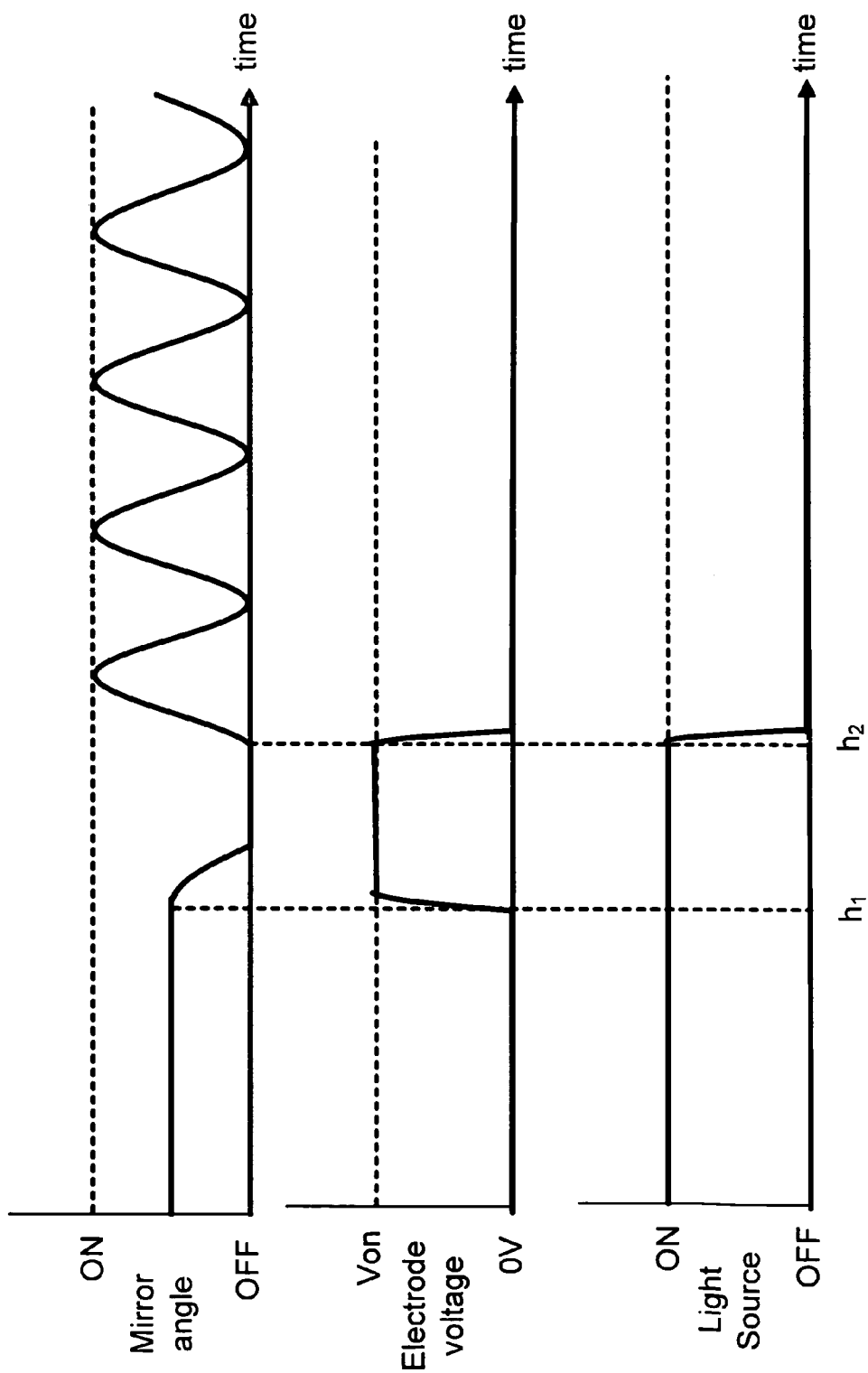
FIG. 22 is a graph illustrating a synchronism among the deflection angle of an individual mirror element, an address electrode and a light source according to the embodiment of the present invention.

FIG. 22 is a timing diagram for illustrating the synchronization of a light source, an address electrode and the deflection angle of each mirror element. In FIG. 22, the vertical axis is the deflection angle of a mirror, which is "ON" or "OFF" based on the constitution of the incident light, the voltage applied to an electrode and the output of a light source. Furthermore, a voltage applied to an electrode is defined as "Von" when a voltage is applied to a single address electrode and as "0 V" when a voltage is not applied. Moreover, the output of a light source is "ON" when outputting the incident light that projects an image, while the output is "OFF" when the power for the light source is completely shut off. Furthermore, the respective horizontal axes represent the elapsed time.

Until the time $h_1$:, the deflecting angle of mirror is controlled to operate between the ON and OFF states, which is the deflecting angle of the initial state, and no voltage is applied to the address electrode, i.e., "0" volts. The assumption here is that the light source is ON. At time $h_1$: a voltage Von is applied to the address electrode to control the mirror to deflect to an ON direction from the initial state and the light source is turned ON. Between time $h_1$ and $h_2$: the voltage is kept applied to the address electrode, making it Von, to position the deflection angle of mirror OFF, and the light source is turned ON. At time $h_2$: the voltage applied to the address electrode is turned OFF to release the deflecting angle of the mirror from the OFF state. As a result, the mirror starts performing a free oscillation, and, the light source is turned off. The turn-off of the voltage applied to the address electrode causes the electric charge to discharge from the ON capacitor 5115b and/or OFF capacitor 5116b, as shown in FIGS. 11 and 18E. The discharge of electricity from a capacitor is accomplished by inputting, for example, "0" volt data to the bit lines 5121-1 and 5121-2 and selecting the word line 5131 in the configuration illustrated in FIG. 11.

Note that the voltage applied to the address electrode is now cut off, and the state after electricity is discharged from the capacitor is the same as the initial state. After time $h_2$: while the light source is OFF, the mirror is left to perform the free oscillation without applying a voltage to the address electrode. This is accomplished by not selecting the word line 5131 while the light source is turned OFF as illustrated in FIG. 11. It is alternatively accomplished by inputting data, such as applying "0" volts to the bit lines 5121-1 and/or 5121-2, with which electricity is not charged to a capacitor when the light source is turned OFF as in the mirror element shown in FIG. 18E.

As described above, an operation by not applying voltage to the address electrode of the mirror device when the light source is turned off reduces the consumption of power necessary to drive the mirror device and alleviates the heat generated. Note that a voltage may be synchronously applied to the address electrode of the mirror device with the transition from turn-off to a turn-on state of the light source, though it is not shown in FIG. 22. Furthermore, such a mirror device can also be used for a projection apparatus.

Application of the control processes may be implemented in image projection systems that include single and multi-panel projection apparatus, described in FIGS. 3 and 4, respectively, which comprise mirror devices. It is desirable for the illumination light and/or the projection light of a projection apparatus according to the present embodiment to be a polarized light, which comprises a polarization control unit.

The control processes may be implemented in exemplary embodiments including a liquid crystal device such as LCD and LCOS controls the polarizing direction. The projection apparatus may comprise a control circuit that controls the emission light intensity and timing of the light source, and a polarization control unit, placed in the illumination light path from the light source or a projection light path that controls the transmission light intensity. The polarization control unit is a commercial product called a color switch that is produced by combining a liquid crystal with a polarization filter. Furthermore, the polarizing direction of the light of a plurality of wavelengths can possibly be controlled by polarization control unit.

Furthermore, it is preferable for a projection apparatus with a configuration that a mirror device is used as a spatial light modulator for a specific color of light has and has a different polarizing direction from that of a light of different colors projected at a different wavelength.

Furthermore, it is preferable that a projection apparatus is configured such that a mirror device is used as a spatial light modulator, and such that the same mirror device modulates illumination lights of different colors and the lights have different polarizing directions and transmitted with different wavelengths, respectively.

For example, when at least one mirror device modulates both illumination lights in two colors with different polarizing directions in a two-panel projection apparatus, placing a transmissive optical element, such as an LCD, in the projection light path, makes it possible to project only the light of a specific polarizing direction. Furthermore, the lights of respective colors can be projected in sequence by changing over the states of the LCD in accordance with the color of an image signal in order to separate polarized lights.

Furthermore, when an optical element, such as a polarizing beam splitter (PBS) for separating a polarized light, is placed in the projection light path, the wavelengths of light transmitting through the PBS can be changed over in sequence by changing the polarizing directions of the illumination lights of two colors with a color switch.

Sequentially changing over polarizing directions also enables, the adjustment of light intensity by comprising sub-light sources. Configuring a light source appropriately sets the number of emitting sub-light sources, positions each wavelength of the light and changes over the sub-light sources in sequence based on the desired polarizing direction.

In this event, the voltage applied to the address electrode is cut off in the mirror device deflecting the illumination light emitted from the sub-light source that is turned off due to the changeover. When the mirror device deflects the illumination lights emitted from a plurality of sub-light sources, however, the voltage applied to the address electrode will be cut off only when the sub-light sources are turned off.

Note that the light source may include sub-light sources emitting the lights of the same wavelength, and the lights have different polarizing directions. Furthermore, the sub-light sources may be made to emit light so that the lights of the same wavelength possess any one or a plurality of polarizing directions.

Furthermore, polarizing directions can be changed 90 degrees by transmitting a linear-polarized light through two pieces of λ/4 plates. It is desirable for the two pieces of λ/4 plates to be placed with the polarization axes 90 degrees apart. The polarizing directions of light can be sequentially changed by either transmitting or not transmitting the light through the two λ/4 plates. Furthermore, there may be one λ/4 plate with light transmitting through it reflected by a surface that is placed at a later stage.

It is further preferable that the light transmitting through the λ/4 plate is reflected by a reflection surface placed at a later stage of the aforementioned λ/4 plate in the light path and then the light is transmitted through the same λ/4 plate. The spatial light modulator is a mirror device, and it is possible for a projection apparatus to implement two mirror devices that modulate the illumination lights having different polarizing directions about the same wavelength.

The projection apparatus is configured such that one mirror device modulates the lights are transmitted as color lights with red and green wavelengths while the other mirror device modulates the lights possessing green and another color light transmitted with blue wavelengths. In this case, the configuration is such that the linear polarization lights with which the directions of the respective green lights differ by 90 degrees are irradiated on the respective mirror devices. Then, the control circuit for the mirror device that changes the intensities and emission periods of the four lights modulates the individual lights, making it possible to adjust the different gray scales and brightness of the individual lights. Then, the modulated individual lights are synthesized, and can be projected by way of a projection optical system.

Furthermore, the spatial light modulator preferably modulates the individual lights on the basis of image signals that correspond to the lights of different wavelengths. The colors of the illumination lights with different wavelengths can be, for example, cyan, magenta, yellow and white.

It is preferable for a projection apparatus to be configured to use a single semiconductor light source; the spatial light modulator, is implemented with a mirror array including one to two million pixels that each control the reflection of the illumination light emitted from the laser light source, with a deflectable mirror that deflects the reflecting direction of modulated illumination light either ON or OFF towards a projection path. The deflection angle of the mirror of the mirror element in an exemplary embodiment is between ±9 degrees and ±4 degrees clockwise (CW) from the initial state. The F-number of the projection lens of the projection optical system is between 3 and 7.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

What is claimed is:

1. A projection apparatus, comprising:
   a mirror device includes a first electrode and a second electrode with an elastic hinge disposed between the first electrode and second electrode for supporting a mirror controlled by applying a voltage to the first and second electrodes to draw the mirror with a Coulomb force toward one of said electrodes;
   a light source for emitting a light for projecting to the mirror for modulating and then reflected by the mirror, wherein the light source is controlled to coordinate with a designated operation of the mirror to suppress an emission of the light during a period when the mirror performs the designated operation; and
   the first electrode and the second electrode are connected to a single drive electrode for applying the voltage to the first and second electrodes and wherein the first electrode and the second electrode having different permittivities.

2. The projection apparatus according to claim 1, wherein:
   the light source is controlled to suppress an emission of the light during a period when the mirror performs the designated operation of changing from a first deflection state of operation with the mirror deflect to a first angle to a second deflection state of operation the mirror deflected to a second angle.

3. The projection apparatus according to claim 2, further comprising:
   a controller to control the mirror to operate in at least three states including a non-deflection state when said mirror is in a natural non-deflection position, a first deflection state and a second deflection when said mirror is deflected to a first deflection angle and a second deflection angle respectively.

4. The projection apparatus according to claim 3, wherein: the first electrode and the second electrode have different cross section areas facing the mirror for generating different drawing forces to deflect the mirror toward the first and second electrodes.

5. The projection apparatus according to claim 1, wherein: the mirror device further comprises a main power supply for supplying power to said light source, and the designated operation of the mirror is carried out after the main power supply is turned on.

6. The projection apparatus according to claim 1, wherein: the light source suppresses the emission of the light during a period when the mirror performs the designated operation.

7. A projection apparatus comprising:
a mirror device includes a first electrode and a second electrode with an elastic hinge disposed between the first electrode and second electrode for supporting a mirror controlled by applying a voltage to the first and second electrodes to draw the mirror with a Coulomb force toward one of said electrodes;
a light source for emitting a light for projecting to the mirror for modulating and then reflected by the mirror, wherein the light source is controlled to coordinate with a designated operation of the mirror to suppress an emission of the light during a period when the mirror performs the designated operation; and,
the first electrode and the second electrode have different permittivities.

8. A projection apparatus comprising:
a mirror device includes a first electrode and a second electrode with an elastic hinge disposed between the first electrode and second electrode for supporting a mirror controlled by applying a voltage to the first and second electrodes to draw the mirror with a Coulomb force toward one of said electrodes;
a light source for emitting a light for projecting to the mirror for modulating and then reflected by the mirror, wherein the light source is controlled to coordinate with a designated operation of the mirror to suppress an emission of the light during a period when the mirror performs the designated operation; and,
the light source is controlled to suppress an emission of the light during a period when the mirror performs the designated operation of changing from a natural non-deflection state to a first deflection state of operation with the mirror deflect to a first deflection angle, and also during a period when the mirror changing from said first deflection state to a second deflection state of operation with the mirror deflected to a second deflection angle.

9. A projection apparatus comprising:
a mirror device includes a first electrode and a second electrode with an elastic hinge disposed between the first electrode and second electrode for supporting a mirror controlled by applying a voltage to the first and second electrodes to draw the mirror with a Coulomb force toward one of said electrodes;
a light source for emitting a light for projecting to the mirror for modulating and then reflected by the mirror, wherein the light source is controlled to coordinate with a designated operation of the mirror to suppress an emission of the light during a period when the mirror performs the designated operation; and,
the mirror device is controlled with externally inputted image data, and the designated operation is carried out after completing display of each frame of the image data.

10. A method for controlling and operating an image projection apparatus implemented with a light source projecting a light to a mirror device having a plurality of micromirrors deflectable to different deflection states for modulating and reflecting the light for projecting images, the method comprising:
controlling an intensity of the light projected from the light source by suppressing the light intensity during an entire time period when the micromirrors are controlled in a non-deflection state; and
continue to suppress the light intensity during the entire time period when the micromirror is deflected to move from the non-deflection state to a deflection state; and
controlling the light source to project a normal intensity for image display when said micromirror is stabilized in the deflection state.

11. A method for controlling and operating a projection apparatus implemented with a light source projecting a light to a mirror device having a plurality of micromirrors each includes electrodes for receiving voltages to deflect to different deflection states for modulating and reflecting the light for projecting images, the method comprising:
controlling an intensity of the light projected from the light source by suppressing the light intensity during an entire time period when the micromirror is controlled in a non-deflection state; and
applying a voltage to the electrodes to control and deflect the micromirror to a first deflection state followed by turning off the voltage applied to the electrode for deflecting the micromirror to a second deflection state according to a natural elastic force of a hinge supporting the micromirror; and
controlling the light source to project a normal intensity for image display when said micromirror is stabilized in the second deflection state.

12. The method for controlling and operating a projection apparatus according to claim 11, wherein:
said step of applying voltages to said electrode further comprising applying a same voltage to a first electrode and a second electrode for controlling the micromirror.

* * * * *